US006898740B2

(12) United States Patent
Olarig

(10) Patent No.: US 6,898,740 B2
(45) Date of Patent: May 24, 2005

(54) COMPUTER SYSTEM HAVING CONFIGURABLE CORE LOGIC CHIPSET FOR CONNECTION TO A FAULT-TOLERANT ACCELERATED GRAPHICS PORT BUS AND PERIPHERAL COMPONENT INTERCONNECT BUS

(75) Inventor: Sompong P. Olarig, Pleasanton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 527 days.

(21) Appl. No.: 09/769,953

(22) Filed: Jan. 25, 2001

(65) Prior Publication Data

US 2002/0099980 A1 Jul. 25, 2002

(51) Int. Cl.[7] .................................................. G06F 11/00
(52) U.S. Cl. ........................................ 714/43; 714/56
(58) Field of Search ............................. 714/42, 40, 43, 714/47, 48, 52, 53, 56; 710/110, 113–116, 121–123, 313

(56) References Cited

U.S. PATENT DOCUMENTS

| | | | | |
|---|---|---|---|---|
| 4,792,950 A | * | 12/1988 | Volk et al. ..................... | 714/4 |
| 5,361,267 A | * | 11/1994 | Godiwala et al. ............ | 714/755 |
| 5,680,537 A | * | 10/1997 | Byers et al. .................... | 714/5 |
| 5,724,528 A | * | 3/1998 | Kulik et al. ................ | 710/311 |
| 5,857,086 A | | 1/1999 | Horan et al. ................ | 395/309 |
| 5,867,645 A | | 2/1999 | Olarig .................... | 395/185.01 |
| 5,884,027 A | * | 3/1999 | Garbus et al. .............. | 709/250 |
| 5,889,970 A | | 3/1999 | Horan et al. ................ | 395/306 |
| 5,892,964 A | | 4/1999 | Horan et al. ........... | 395/800.23 |
| 5,923,860 A | | 7/1999 | Olarig ........................ | 395/309 |
| 6,018,810 A | | 1/2000 | Olarig ......................... | 714/43 |
| 6,108,740 A | * | 8/2000 | Caldwell .................... | 710/305 |
| 6,507,612 B1 | * | 1/2003 | Fujimaki .................... | 375/224 |
| 6,625,740 B1 | * | 9/2003 | Datar et al. ................. | 713/324 |

* cited by examiner

Primary Examiner—Dieu-Minh Le

(57) ABSTRACT

A core logic chipset for a computer system is provided which can be configured as a bridge between either an accelerated graphics port (AGP) bus or an additional peripheral component interconnect (PCI) bus. A common bus having provisions for the PCI and AGP interface signals is connected to the core logic chipset and either an AGP or PCI device(s). The common bus, which is part of a fault-tolerant interconnect system, includes a first bus portion and a lower bus portion. When an error (e.g., a parity error) is detected on the first bus portion, the transaction is transferred over the second bus portion. When an error is detected on the second bus portion, the transaction is transferred over the first bus portion. If errors are detected on both portions, the transaction may be terminated.

46 Claims, 28 Drawing Sheets

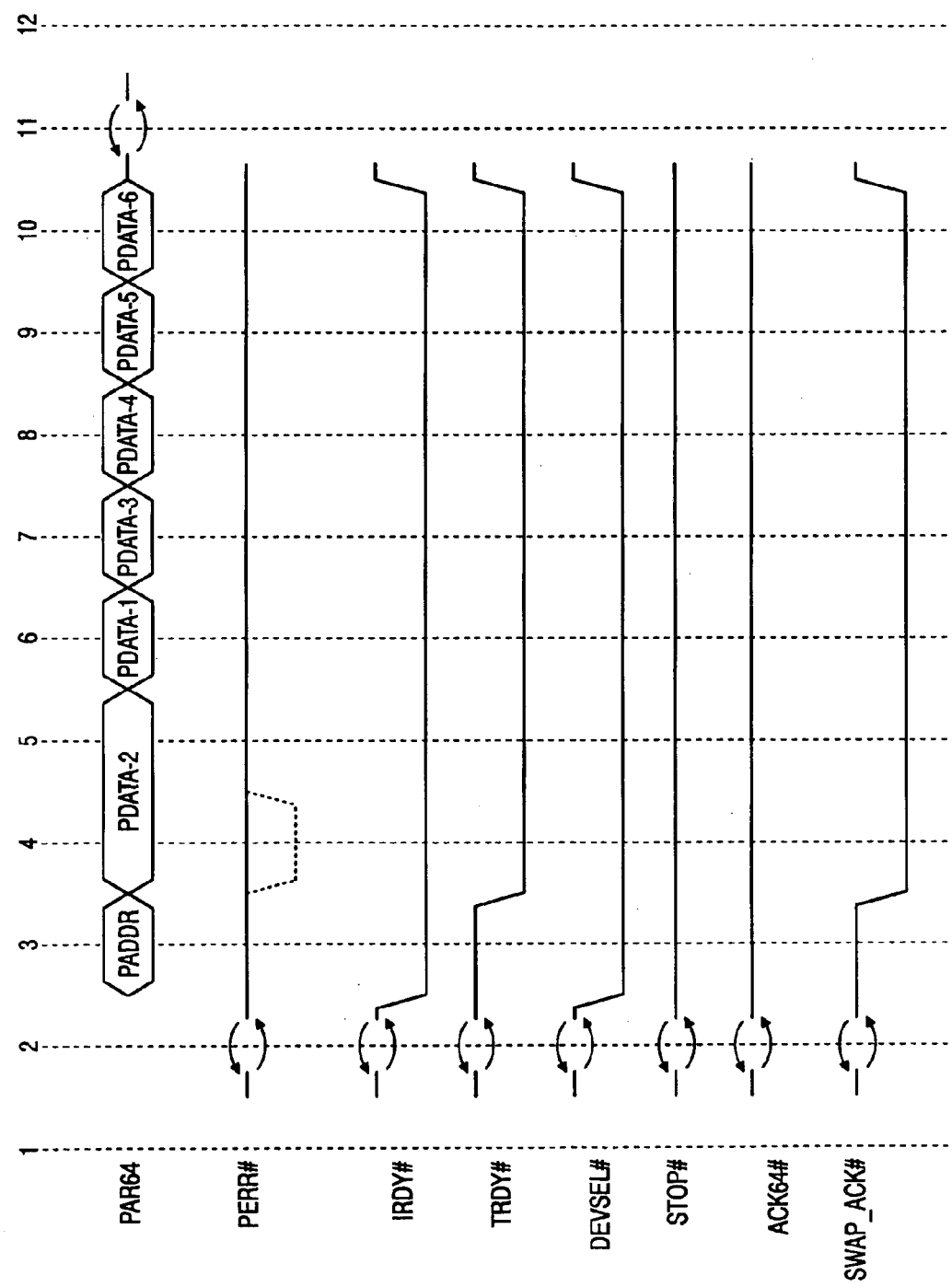

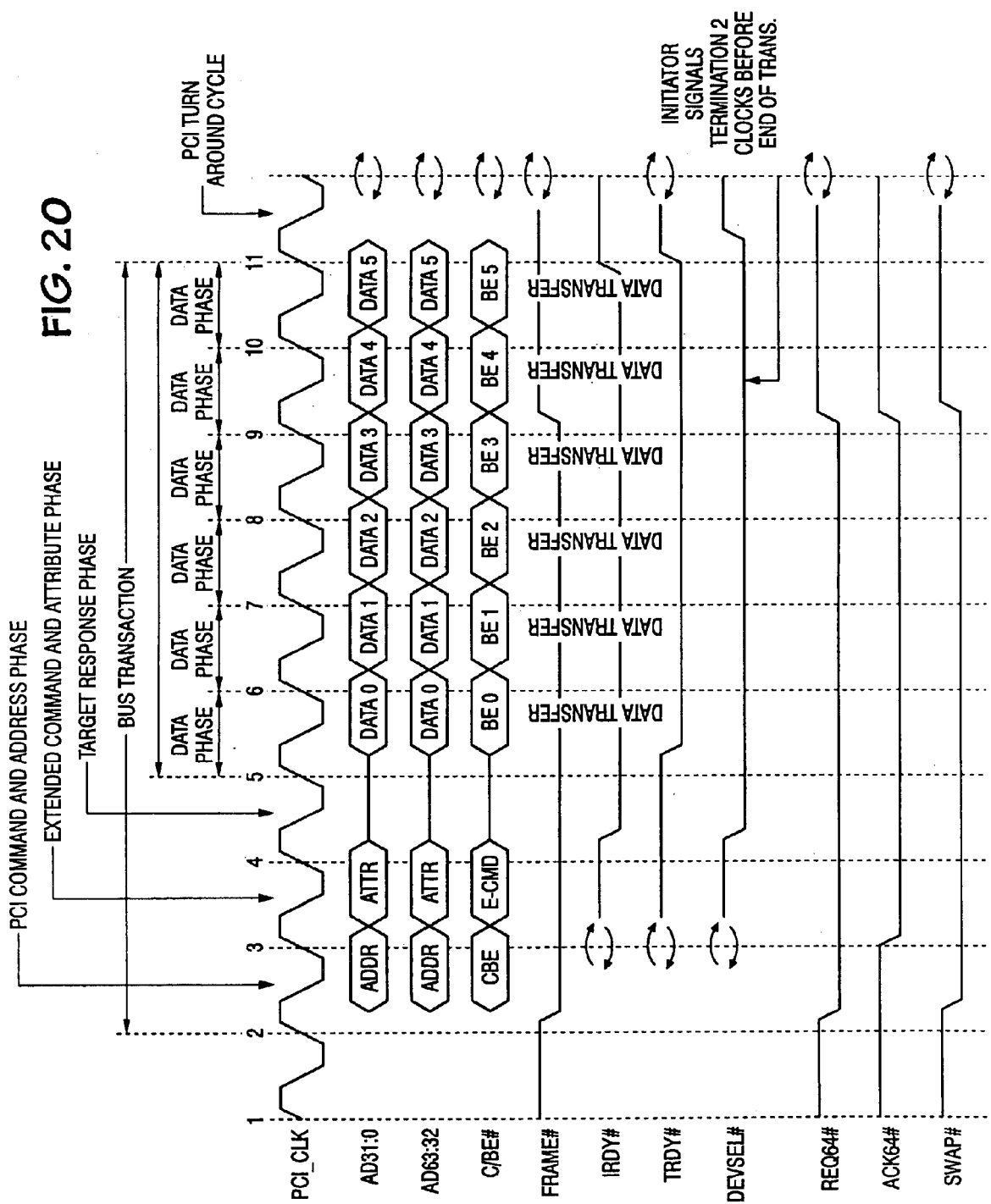

COMPUTER SYSTEM HAVING CONFIGURABLE CORE LOGIC CHIPSET FOR CONNECTION TO A FAULT-TOLERANT ACCELERATED GRAPHICS PORT BUS AND PERIPHERAL COMPONENT INTERCONNECT BUS

BACKGROUND OF THE INVENTION

1. Field of the Invention

The present invention relates to computer systems using information buses to interface a central processor(s), random access memory and input-output peripherals together, and more particularly, in utilizing the same logic circuit as a bus bridge for either a fault-tolerant accelerated graphics port (AGP) bus or a fault-tolerant peripheral component interconnect (PCI) bus.

2. Description of the Related Art

Use of computers, especially personal computers, in business and at home is becoming more and more pervasive because the computer has become an integral tool of most information workers who work in the fields of accounting, law, engineering, insurance, services, sales and the like. Rapid technological improvements in the field of computers have opened up many new applications heretofore unavailable or too expensive for the use of older technology mainframe computers. These personal computers may be used as stand-alone workstations (high end individual personal computers) or linked together in a network by a "network server" which is also a personal computer which may have a few additional features specific to its purpose in the network. The network server may be used to store massive amounts of data, and may facilitate interaction of the individual workstations connected to the network for electronic mail ("E-mail"), document databases, video teleconferencing, whiteboarding, integrated enterprise calendar, virtual engineering design and the like. Multiple network servers may also be interconnected by local area networks ("LAN") and wide area networks ("WAN").

A significant part of the ever increasing popularity of the personal computer, besides its low cost relative to just a few years ago, is its ability to run sophisticated programs and perform many useful and new tasks. Personal computers today may be easily upgraded with new peripheral devices for added flexibility and enhanced performance. A major advance in the performance of personal computers (both workstation and network servers) has been the implementation of sophisticated peripheral devices such as video graphics adapters, local area network interfaces, SCSI bus adapters, full motion video, redundant error checking and correcting disk arrays, and the like. These sophisticated peripheral devices are capable of data transfer rates approaching the native speed of the computer system microprocessor central processing unit ("CPU"). The peripheral devices' data transfer speeds are achieved by connecting the peripheral devices to the microprocessor(s) and associated system random access memory through high speed expansion local buses. Most notably, a high speed expansion local bus standard has emerged that is microprocessor independent and has been embraced by a significant number of peripheral hardware manufacturers and software programmers. This high speed expansion bus standard is called the "Peripheral Component Interconnect" or "PCI." A more complete definition of the PCI local bus may be found in the PCI Local Bus Specification, revision 2.1; PCI/PCI Bridge Specification, revision 1.0; PCI System Design Guide, revision 1.0; PCI BIOS Specification, revision 2.1, and Engineering Change Notice ("ECN") entitled "Addition of 'New Capabilities' Structure," dated May 20, 1996, the disclosures of which are hereby incorporated by reference. Enhancements to the PCI Local Bus Specification may be found in the "PCI-X Addendum to the PCI Local Bus Specification, Revision 1.0," dated Sep. 22, 1999, the disclosure of which is hereby incorporated by reference. These PCI specifications and ECN are available from the PCI Special Interest Group, P.O. Box 14070, Portland, Oreg. 97214.

A computer system uses a plurality of information (data and address) buses such as a host bus, a memory bus, at least one high speed expansion local bus (such as the PCI bus), and other peripheral buses such as the Small Computer System Interface (SCSI), Extension to Industry Standard Architecture (EISA), and Industry Standard Architecture (ISA). The microprocessor(s) (CPU) of the computer system communicates with main memory and with the peripherals that make up the computer system over these various buses. The microprocessor(s) communicate(s) to the main memory over a host bus to memory bus bridge. The main memory generally communicates over a memory bus through a cache memory bridge to the CPU host bus. The peripherals, depending on their data transfer speed requirements, are connected to the various buses which are connected to the microprocessor host bus through bus bridges that detect required actions, arbitrate, and translate both data and addresses between the various buses.

The choices available for the various computer system bus structures and devices residing on these buses are relatively flexible and may be organized in a number of different ways. One of the more desirable features of present day personal computer systems is their flexibility and ease in implementing custom solutions for users having widely different requirements. Slower peripheral devices may be connected to the ISA or EISA bus(es), other peripheral devices, such as disk and tape drives may be connected to a SCSI bus, and the fastest peripheral devices such as network interface cards (NICs) and video graphics controllers may require connection to the PCI bus. Information transactions on the PCI bus may operate at 33 MHz or 66 MHz clock rates and may be either 32 or 64-bit transactions. Transactions on the PCI-X bus may operate at 66 MHz or 133 MHz clock rates and may be either 32 or 64-bit transactions.

The PCI and PCI-X Specifications support a high 32 bit bus, referred to as the 64 bit extension to the standard low 32 bit bus. The 64 bit bus provides additional data bandwidth for PCI or PCI-X devices that require it. The high 32 bit extension for 64 bit devices requires an additional 39 signal pins: REQ64#, ACK64#, AD[63:32], C/BE[7:4]#, and PAR64. These signals are defined more fully in the PCI and PCI-X Specifications incorporated by reference hereinabove. Thirty-two bit PCI or PCI-X devices work unmodified with 64 bit PCI or PCI-X devices. A 64 bit PCI or PCI-X device must default to 32-bit operation unless a 64-bit transaction is negotiated. Sixty-four bit transactions on the PCI or PCI-X bus are dynamically negotiated (once per transaction) between the master and target PCI devices. This is accomplished by the master asserting REQ64# and the target responding to the asserted REQ64# by asserting ACK64#.

Once a 64 bit transaction is negotiated, it holds until the end of the transaction. Signals REQ64# and ACK64# are externally pulled up by pull up resistors to ensure proper behavior when mixing 32-bit and 64-bit devices on the PCI or PCI-X bus. A central resource controls the state of REQ64# to inform the 64-bit device that it is connected to a 64-bit bus. If REQ64# is deasserted when RST# is deasserted, the device is not connected to a 64-bit bus. If REQ64# is asserted when RST# is deasserted, the device is connected to a 64-bit bus.

In addition to the advent of the high speed expansion bus, increasingly sophisticated microprocessors have revolutionized the role of the personal computer by enabling complex application software to run at mainframe computer speeds. The latest micro-processors have brought the level of technical sophistication to personal computers that, just a few years ago, was available only in mainframe computer systems. Some representative examples of these new microprocessors are the "PENTIUM" and "PENTIUM PRO" (registered trademarks of Intel Corporation). Advanced microprocessors also are manufactured by Advanced Micro Devices, Cyrix, IBM, Digital Equipment Corporation, and Motorola.

The sophisticated microprocessors have, in turn, made possible running complex application programs using advanced three dimensional ("3-D") graphics for computer aided drafting and manufacturing, engineering simulations, games, etc. Increasingly complex 3D graphics require higher speed access to ever larger amounts of graphics data stored in memory. This memory may be part of the video graphics processor system, but preferably, would be best (lowest cost) if part of the main computer system memory. Intel Corporation has proposed a low cost but improved 3-D graphics standard called the "Accelerated Graphics Port" (AGP) initiative.

The Intel AGP 3-D graphics standard defines a high speed data pipeline, or "AGP bus," between the graphics controller and system memory. The Intel AGP graphics standard is a specification which provides signal, protocol, electrical, and mechanical specifications for the AGP bus and devices attached thereto. This specification is entitled "Accelerated Graphics Port Interface Specification, Revision 1.0," dated Jul. 31, 1996, the disclosure of which is hereby incorporated by reference. Enhancements to the AGP 1.0 specification are included in the "Accelerated Graphics Port Interface Specification, Revision 2.0," dated May 4, 1998, the disclosure of which is hereby incorporated by reference. The AGP specifications are available from Intel Corporation, Santa Clara, Calif.

The AGP 1.0 interface specification uses the 32-bit, 66 MHz PCI (revision 2.1) specification as an operational baseline, with three performance enhancements. These enhancements are 1) a pipeline memory read and write operations, 2) demultiplexing of address and data on the AGP bus by use of sideband signals, and 3) data transfer rates of 133 MHz for data throughput in excess of 500 MB per second. The remaining AGP 1.0 specification does not modify the PCI specification, but rather provides a range of graphics-oriented performance enhancement for use by 3-D graphics hardware and software designers. The AGP 1.0 specification is neither meant to replace nor diminish full use of the PCI standard in the computer system. The AGP 1.0 specification creates an independent and additional high speed local bus for use by 3-D graphics devices such as a graphics controller, wherein the other input/output ("I/O") devices of the computer system may remain on any combination of the PCI, SCSI, EISA, and ISA buses.

The AGP 2.0 specification supports 64 bit memory addressing, which is beneficial for addressing memory sizes allocated to the AGP device that are larger than 2 GB. The AGP 2.0 specification also includes other enhancements. For example, the AGP 2.0 specification supports 1) 4× transfer mode with low voltage electrical signals that allows four data transfers per 66 MHz clock cycle, providing data throughput of up to 1 GB/sec; 2) five additional sideband signals; 3) a fast write protocol; 4) new input/output buffers; and 5) new mechanical connectors.

To functionally enable an AGP 1.0 or 2.0 graphics bus, new computer system hardware and software are required. At a minimum, this requires new computer system core logic designed to function as a host bus/memory bus/PCI bus to AGP bus bridge meeting the AGP 1.0 or 2.0 specifications. The computer system core logic must still meet the PCI or PCI-X standards referenced above and facilitate interfacing the PCI or PCI-X buses to the remainder of the computer system. This adds additional cost to a personal computer system, but is well worth it if 3-D graphics are utilized. Some personal computer uses such as a network server do not require 3-D graphics, but would greatly benefit from having an additional PCI or PCI-X bus with multiple PCI card slots for accepting additional input/output devices.

In view of the above, it would be desirable to provide a computing system having a core logic chipset configurable for either an AGP bus or an additional PCI bus without requiring different logic and interface circuits for each type of bus.

Many components and connections are required for operation of the features inherent in today's computer systems, thus increasing a potential risk of latent failures. Miniaturization and automated assembly have decreased the cost of computers, but sometimes create these latent malfunctions that occur during operation of the computer system. Typically, printed circuit boards having conductive patterns are used to interconnect integrated circuit packages such as a ball grid array (BGA) using surface mount techniques. There may be hundreds of contacts (tiny solder balls) on a BGA package and each must be properly connected to respective connections of the conductive patterns on the printed circuit boards of the computer system. Some problems that may not be found during manufacture, or that may develop later during operation of the computer system, are shorted or open connections to the contacts of the BGA package. Unless pattern sensitive tests are run, an open connection may appear as the correct logic level, and shorted connections may not be noticed if the same logic level is on the shorted connections. Devices in the integrated circuit packages of the computer system also may either short or open, giving an erroneous signal. Generation and checking of parity is a way of detecting data transmission malfunctions in the computer system.

Parity information may be provided for all PCI/PCI-X/AGP devices that drive address and/or data information onto the address/data (AD[31:0]) bus. The AD[31:0] bus is a time-multiplexed address/data bus. During the address phase of a PCI/PCI-X/AGP transaction, the AD[31:0] bus carries the start address of the transaction. The Command or Byte Enable bus (C/BE#[3:0]), defines the type of transaction to be performed. A Parity signal (PAR) is driven by the initiator one clock after completion of the address phase either high or low to ensure even parity with the AD[31:0] bus and the C/BE#[3:0] bus for a total of 37 bits having an even parity, i.e., the number of logic "1s" on the combined 37 bit bus is an even number.

During the data phase(s) of the PCI/PCI-X/AGP transaction, the AD[31:0] bus is driven by the initiator (during a write transaction) or the currently-addressed target (during a read transaction). The C/BE#[3:0] bus is driven by the initiator to indicate the bytes to be transferred within the currently-addressed doubleword ([31:0]) and the data paths to be used to transfer the data. PAR is driven by either the initiator (during a write transaction) or the currently-addressed target (during a read transaction) so that the combination of AD[31:0], C/BE#[3:0] and PAR (37 bits total) has an even parity (an even number of logic "1s"). For 64 bit data transfers the upper address/data bus AD[61:32]) and C/BE#[7:4], in conjunction with the lower address/data bus AD[31:0] and C/BE#[3:0], are utilized to transfer a quadword (64 bits) of data. An upper Parity signal (PAR64) is used in combination with the AD[61:32] and C/BE#[7:4] buses to represent an even parity across these upper 37 bits.

The bus agent receiving the data (target on a write transaction or initiator on a read transaction) must calculate whether a parity bit should be a logic "1" or a logic "0" to produce an even parity based upon the number of logic "1s" received on the combination of the AD and C/BE buses. If the calculated parity bit does not match the logic value of the asserted PAR or PAR64 for the upper bus, then a parity error has occurred, and a parity error signal (PERR#) may be generated to indicate that a parity error has occurred on either or both of the upper AD[63:32] and CB/E#[7:4] buses, or lower AD[31:0] and CB/E#[3:0] buses during a data phase. PERR# does not indicate which of these buses has the data parity error, however.

To ensure more versatile recovery from faults, it would be desirable to provide an apparatus, method, and system for improving fault tolerance on a 64-bit data-width PCI/PCI-X/AGP bus when either of the upper or lower 32-bit data-width portions of the 64-bit data-width bus may have an operating fault.

The improved fault-tolerance feature may be implemented in conjunction with a core logic chipset that could be configured for either an AGP bus or an additional PCI/PCI-X bus. When the core logic chipset is configured for an AGP bus, and the AGP bus is used for advanced graphics applications, fault tolerance may not be needed and thus may be disabled. However, when the AGP bus is used as a standard I/O bus (e.g., PCI or PCI-X), the fault tolerance features described above will provide for a more robust computer system. Thus, it would be desirable to provide a computer system in which the fault tolerance feature is disabled when the AGP bus is used for advanced 3-D graphics applications, and disabled when the AGP bus is used as a standard I/O bus.

SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

The present invention overcomes the above-identified problems as well as other shortcomings and deficiencies of existing technologies by providing in a computer system a configurable core logic chipset that supports a fault tolerant 64-bit data-width PCI/PCI-X/AGP bus system which may recover from a fault(s) occurring on either the upper or lower 32-bit portions of a 64-bit data-width bus. Selection of the type of bus bridge (i.e., PCI, PCI-X, or AGP) in the core logic chipset may be made by a hardware signal input, software during computer system configuration, or power on self test ("POST"). Software configuration also may be determined upon detection of either an AGP, PCI, or PCI-X device connected to the bus.

A 64-bit data-width transaction is negotiated in accordance with the aforementioned PCI/PCI-X/AGP Specifications except that new sideband signals SWAP# and SWAP_ACK# are utilized in the present invention. During the transaction address phase, a 32-bit address is asserted on both the lower address/data (AD[31:0]) bus and the upper address/data (AD[63:32]) bus. The value of this 32-bit address is the same on both the upper and lower address/data buses. The present invention supports a 32-bit address, Single Address Cycle (SAC) and a 64-bit address, Dual Address Cycle (DAC). During the address phase of the 64-bit data-width transaction, the bus master, according to the present invention, may assert both the REQ64# and SWAP# signals on the bus. The target may respond to the asserted REQ64# and SWAP# signals by asserting a) the ACK64#, or else b) the SWAP_ACK#, or c) neither ACK64# nor SWAP_ACK#. These three target responses correspond to the target being ready, after also asserting DEVSEL# and TRDY#, to transfer data at a) 64 bits across both the upper AD[63:32] and lower AD[31:0] buses, b) 32 bits across only the upper AD[63:32] bus, or c) 32 bits across only the lower AD[31:0] bus, respectively.

During a normal 64-bit data-width transaction, when REQ64# is detected by the target, the target will assert ACK64# if the combination of the upper AD[63:32] and C/BE[7:4] buses, and PAR64 (hereinafter upper bus); and the lower AD[31:0] and C/BE[3:0] buses, and PAR (hereinafter lower bus) have no detected parity errors during the address phase; and a downshift or swap bit in a control register of the target has not been set so that only the lower bus or the upper bus, respectively, may be used for data transfers. Downshifting herein means that only the lower bus is used for the data transaction. Swapping herein means that only the upper bus is used for the data transaction.

Downshifting may occur when the target detects a parity error on the combination of the upper 32-bit address/data AD[63:32] bus, control byte enable C/BE[7:4] bus and PAR64 (upper PCI bus) during the address phase, or when a 64-Bit Disable bit in the target's command register is set. The 64-Bit Disable bit in the target's command register may have been set during a previous write transaction to the target in which the target determined that the upper bus had a parity error. The parity error on the upper bus may have been caused by a faulty signal line in the upper bus, a faulty receiver in the target, or a faulty driver in the initiator. The 64-Bit Disable bit in the target's command register may also have been set during a "built-in-self-test" (BIST) during startup or diagnostic testing of components in the computer system.

Swapping may occur when the target detects a parity error on the combination of the lower 32-bit address/data AD[31:0] bus, control/byte enable C/BE[3:0] bus and PAR during the address phase, or when a Swap Enabled bit in the target's command register is set. The Swap Enabled bit in the target's command register may have been set during a previous write transaction to the target in which the target determined that the lower bus had a parity error. The parity error on the lower bus may have been caused by a faulty signal line in the lower bus, a faulty receiver in the target, or a faulty driver in the initiator. The Swap Enabled bit in the target's command register may also have been set during a "built-in-self-test" (BIST) during startup or diagnostic testing of the computer system.

The present invention utilizes the transaction address phase to determine whether the data phase transaction will properly function across 64-bits (normal), 32-bits on the lower AD[31:0] bus, or 32-bits on the upper AD[63:32] bus. The target may insert wait states into the transaction for enough clocks (time delay) to determine whether there is a parity error on either or both of the upper and lower buses during the address phase. If an address phase parity error on the upper bus is determined, the target will not assert ACK64# and SWAP_ACK#, and the data phase transaction will occur only on the lower bus. If an address phase parity error on the lower bus is determined, the target will assert SWAP_ACK# but not ACK64#, and the data phase transaction will occur only on the upper bus. If address phase parity errors are determined on both the upper and lower buses during the address phase, the target may assert SERR# according to the PCI/PCI-X specifications. Thus, the present invention may dynamically determine whether a 64-bit, 32-bit lower bus, or 32-bit upper bus data phase transaction may occur without having to terminate or abort the current bus transaction due to detection of a parity error during the address phase. The address asserted by the initiator on either the lower or upper bus without a parity error will be used by the target for the current transaction. If there is no parity error during the address phase, the address on either the lower bus or the upper bus may be used. It is also contemplated herein that the correct addresses (proper parity) on both the upper and lower buses may be compared for a match so as to increase security and reliability of the computer system.

It is contemplated and within the scope of the present invention to terminate a transaction when a parity error is detected during the data phase thereof. A write transaction having a parity error may be terminated by the target as follows: 1) The target signals "Retry" by asserting STOP# and not asserting TRDY# on the initial data phase of the transaction; 2) "Disconnect" with data may be signaled during any portion of the data phase by the target asserting TRDY# and STOP# together; 3) "Target-Abort" may be signaled by the target deasserting DEVSEL# and asserting STOP# at the same time. These are all standard terminations defined more fully in the PCI/PCI-X Specifications incorporated by reference hereinabove. When the target terminates the transaction having a parity error, it may also set the appropriate bit(s) in its command and/or status registers so that when the next transaction occurs, i.e., on a Retry, the target can respond by either not asserting the ACK64# and SWAP_ACK# (lower bus transfer only), or by just asserting the SWAP_ACK# (upper bus transfer only).

In a similar fashion, during a data phase read transaction, the initiator determines whether a data parity error exists on the upper or lower buses. Upon detecting a data parity error, the initiator may set an appropriate bit(s) in its command and/or status registers, and terminate the read transaction. Upon a retry of the read transaction, the initiator may not assert REQ64# and SWAP# if the data parity error was found on the upper bus. If the data parity error was found on the lower bus, then the initiator asserts SWAP# but not REQ64#. The target then responds accordingly by asserting only DEVSEL# for a lower bus transaction, or DEVSEL# and SWAP_ACK# for an upper bus transaction.

The aforementioned examples contemplate bus data transfer behavior modification of the agent that determines the parity error on either the upper or lower buses. During a write transaction the target receives information during both the address and data phases and determines any parity errors thereof. During a read transaction the target only determines a parity error of the address phase, whereas the initiator determines a parity error during the data phase, i.e., data being sent by the target to the initiator. It is contemplated and within the spirit and scope of the present invention that bus data transfer behavior modification may be performed on either or both the receiving and/or transmitting agents. The cause of the parity error may be from a defective signal line receiver, driver, or bus connection. The software device driver for the device(s) and/or operating system software may attempt a retry of the transaction when a parity error has been reported by the device.

Statistical analysis may also be performed by computer system software based on the parity error information reported to the software device drivers and operating system software so that a failure report may be generated which indicates device and bus abnormalities. This may allow a technician to be alerted so that the computer system may be tested and/or serviced before a catastrophic failure occurs. This feature of the present invention is especially advantageous with hot-pluggable device cards which may be substituted and/or replaced without turning off the computer system.

BRIEF DESCRIPTION OF THE DRAWINGS

The foregoing and other advantages of the invention will become apparent upon reading the following detailed description and upon reference to the drawings in which:

FIG. 20 is a schematic timing diagram of a PCI-X write operation with the fault-tolerant feature of the present invention.

DETAILED DESCRIPTION OF SPECIFIC EMBODIMENTS

Figure 1:
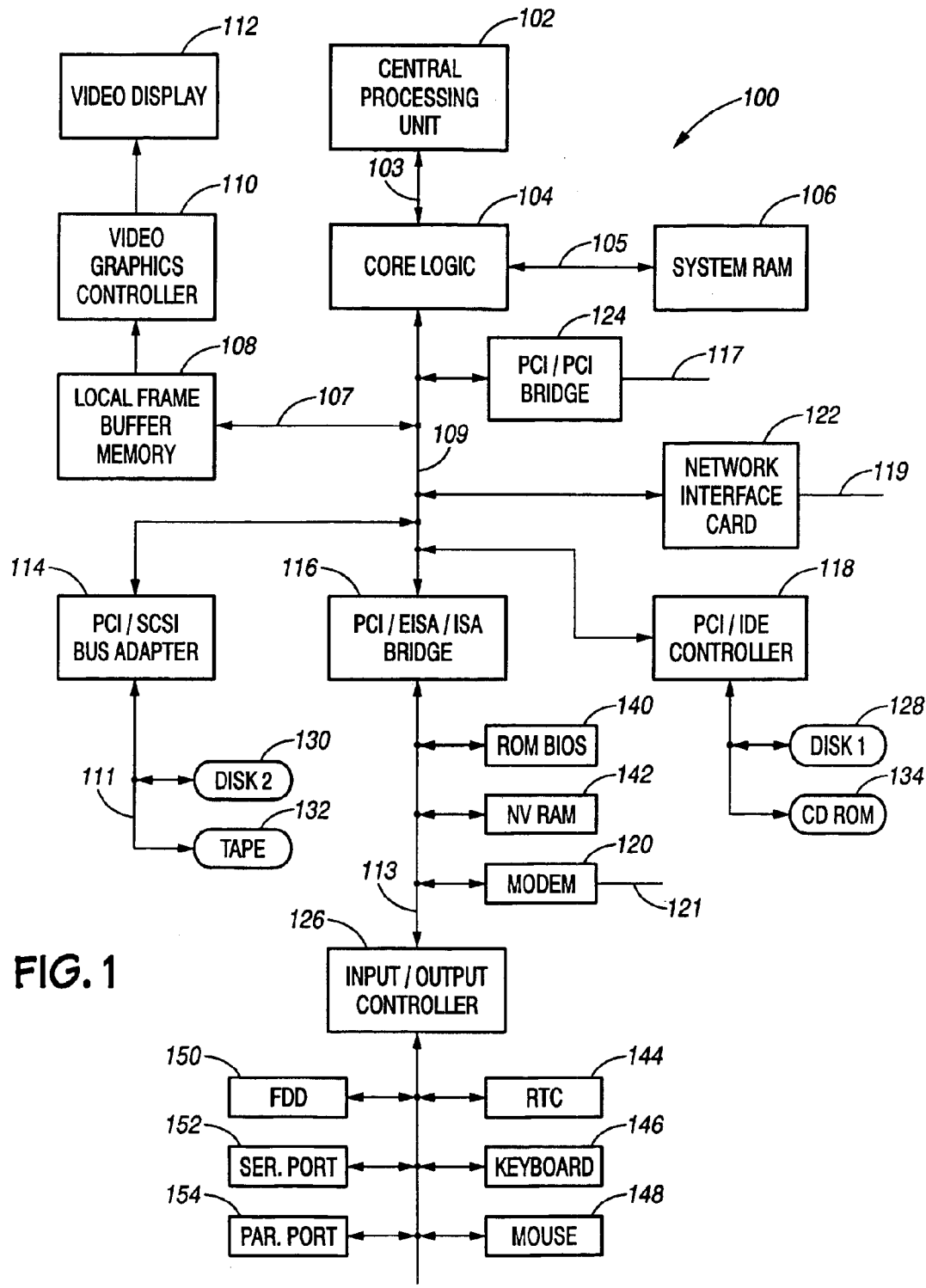
FIG. 1 is a schematic block diagram of a computer system.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present invention is an apparatus, method, and system for providing in a computer system a multiple use core logic chipset capable of implementing either a bridge between the host and the memory buses and an AGP bus, or a bridge between the host and memory buses and an additional PCI or PCI-X bus. Another embodiment of the multiple use core logic chipset of the present invention implements either a bridge between the host and memory buses and an AGP bus, or a bridge between the primary PCI or PCI-X bus and an additional PCI or PCI-X bus. Either implementation may be configured by hardware input signals to the multiple use core logic chipset or by software programming thereof.

In conjunction with the multiple use core logic chipset, the present invention further is an apparatus, method, and system for improving fault tolerance on a 64-bit data-width PCI, PCI-X or AGP bus, coupled to the chipset, when either the upper or lower 32-bit data-width portions of the 64-bit data-width bus may have an unrecoverable operating fault. The present invention provides in a computer system a fault tolerant 64-bit data-width PCI, PCI-X, or AGP bus system that may recover from any fault occurring on either the upper or lower portions of the 64-bit data width bus.

The PCI and PCI-X buses were developed to have sufficient data bandwidth for high performance peripherals such as a video controller, a high speed network interface card(s), a hard disk controller(s), a SCSI adapter, a wide area network digital router, and the like. A PCI or PCI-X bus may have a plurality of card connectors attached thereto, or PCI or PCI-X devices may be embedded on the computer system printed circuit motherboard. Sophisticated graphics and increased network data transfer requirements have put upward pressure on the PCI or PCI-X buses for faster data transfers between the computer system main memory, host processor(s), and peripherals. Thus, a 64 bit bus(es) is desirable, however, introducing more data paths increases the likelihood that a data error(s) may occur.

The AGP 10 and 2.0 buses were developed to have sufficient data bandwidth for a video controller in a computer system to run increasingly complex 3-D graphics applications, such as games and engineering simulations. Not all computer systems, however, need the capability of running 3-D graphics, but would greatly benefit by having an additional PCI or PCI-X bus. Computers used as network servers generally implement only simple two dimensional graphics, thus the AGP bus may provide enhanced performance features that would not be used by this type of computer.

The AGP 1.0 and 2.0 interface specifications are a variation or superset of the PCI specification, and thus share many common signal functions. Furthermore, the AGP bridge connects to the processor host bus and system memory bus through the computer system core logic chipset. Thus, it would be desirable to use the chipset logic in driver circuits of the AGP bridge as an additional PCI/PCI-X bridge to enhance the versatility of the core logic chipset and reduce the overall cost of computer systems, both workstation and network servers, by having a common multiple use core logic chipset.

For illustrative purposes, the preferred embodiments of the present invention are described hereinafter for computer systems utilizing the Intel x86 microprocessor architecture and certain terms and references will be specific to that processor platform. PCI, PCI-X, and AGP are interface standards, however, that are hardware independent and may be utilized with any host computer designed for this interface standard. It will be appreciated by those skilled in the art of computer systems that the present invention may be adapted and applied to any computer platform utilizing the PCI, PCI-X, and AGP interface standards.

Referring now to the drawings, the details of exemplary embodiments of the present invention are schematically illustrated. Like elements in the drawings will be represented by like numbers, and similar elements will be represented by like numbers with a different lower case letter suffix.

Referring to FIG. 1, a schematic block diagram of a computer system according to the present invention is illustrated. The computer system is generally indicated by the numeral 100 and comprises a central processing unit(s) ("CPU") 102, core logic 104, system random access memory ("RAM") 106, a video graphics controller 110, a local frame buffer 108, a video display 112, a PCI/SCSI bus adapter 114, a PCI/EISA/ISA bridge 116, a PCI/IDE controller 118, and, optionally, a network interface card ("NIC") 122. Single or multilevel cache memory (not illustrated) may also be included in the computer system 100 according to the current art of microprocessor computer systems. The CPU 102 may be a plurality of CPUs 102 in a symmetric or asymmetric multiprocessor configuration.

The CPU(s) 102 is connected to the core logic 104 through a CPU host bus 103. The system RAM 106 is connected to the core logic 104 through a memory bus 105. The video graphics controller 110 is connected to the core logic 104 through an AGP bus 107. The local frame buffer 108 is connected between the video graphics controller 110 and the PCI/PCI-X bus 109. The PCI/SCSI bus adapter 114, PCI/EISA/ISA bridge 116, PCI/DE controller 118, NIC 122, and a PCI/PCI bridge 124 are connected to the PCI/PCI-X bus 109. Some of the devices, such as the PCI/PCI bridge 124 and NIC 122, may plug into PCI/PCI-X connectors on the computer system 100 motherboard.

Hard disk 130 and tape drive 132 are connected to the PCI/SCSI bus adapter 114 through a SCSI bus 111. The NIC 122 may be connected to a local area network 119. The PCI/EISA/ISA bridge 116 connects over an EISA/ISA bus 113 to a ROM BIOS 140, non-volatile random access memory (NVRAM) 142, modem 120, and input-output controller 126. The modem 120 connects to a telephone line 121. The input-output controller 126 interfaces with a keyboard 146, real time clock (RTC) 144, mouse 148, floppy disk drive ("FDD") 150, serial port 152, and parallel port 154. The EISA/ISA bus 113 is a slower information bus than the PCI/PCI-X bus 109, but it costs less to interface with the EISA/ISA bus 113.

When the computer system 100 is first turned on, start-up information stored in the ROM BIOS 140 is used to begin operation thereof. Basic setup instructions are stored in the ROM BIOS 140 so that the computer system 100 can load more complex operating system software from a memory storage device such as the disk 130. Before the operating system software can be loaded, however, certain hardware in the computer system 100 must be configured to properly transfer information from the disk 130 to the CPU 102. In the computer system 100 illustrated in FIG. 1, the PCI/SCSI bus adapter 114 must be configured to respond to commands from the CPU 102 over the PCI/PCI-X bus 109 and AGP bus 107 and transfer information from the disk 130 to the CPU 102 via buses 107, 109, and 103. Also during startup a "built-in-self-test" (BIST) may do diagnostic testing of components, such as PCI, PCI-X, and AGP devices, in the computer system.

Figure 2:
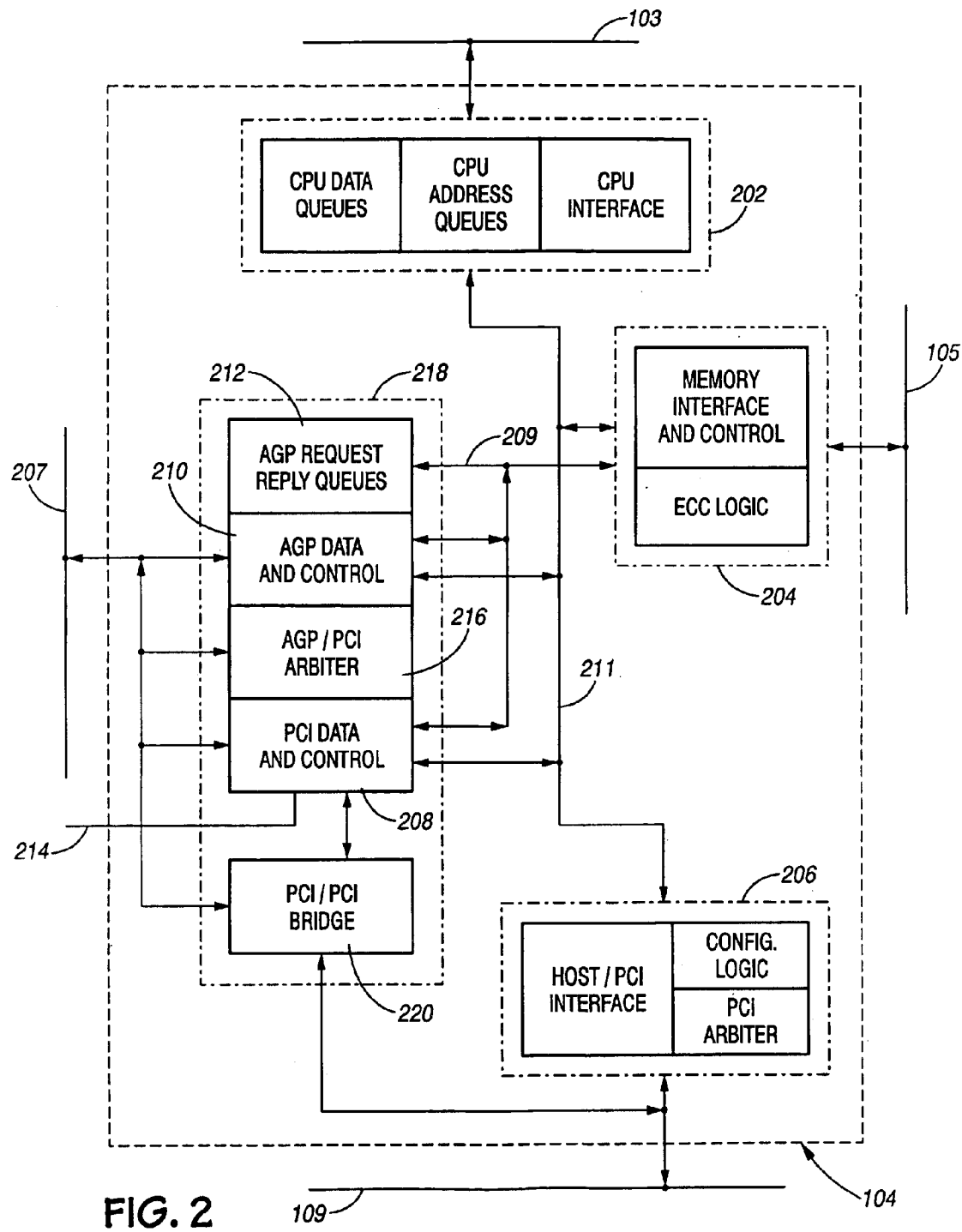
FIG. 2 is a schematic functional block diagram of a configurable core logic chip set for use in the computer system of FIG. 1 in accordance with the invention.

Referring now to FIG. 2, a schematic functional block diagram of the core logic 104 of FIG. 1, according to the present invention as illustrated. The core logic 104 functionally comprises CPU host bus interface and queues 202, memory interface and control 204, host front/PCI bridge 206, and AGP front/PCI logic 218. The AGP front/PCI logic 218 comprises PCI data and control 208, AGP front/PCI arbiter 216, AGP data and control 210, and AGP request/reply queues 212. The CPU host bus interface and queues 202 connects to the host bus 103 and includes interface logic for all data, address, and control signals associated with the CPU 102 of the computer system 100. Multiple CPUs 102 and cache memory (not illustrated) are contemplated and within the scope of the present invention.

The CPU host bus interface and queues 202 interface with the host front/PCI bridge 206 and memory interface and control 204 over a core logic bus 211. The CPU host bust interface and queues 202 interface with the PCI data and control 208, and AGP data and control 210 over the core logic bus 211. The memory interface and control 204 interfaces with the PCI data and control 208, AGP data and control 210, and AGP request front/reply queues 212 over a core logic bus 209. An advantage of having separate buses 209 and 211 is that concurrent bus operations may be performed thereover. For example, video data stored in system RAM 106 may be transferring to the video graphics controller 110 while the CPU 102 on the host bus 103 is accessing an independent PCI or PCI-X device (e.g., an IC 122) on the PCI/PCI-X bus 109.

The host bus interface and queues 202 allows the CPU 102 to pipeline cycles and schedule snoop accesses. The memory interface and control 204 controls the control and timing signals for the computer system RAM 106 which may be synchronous dynamic RAM and the like. The memory interface and control 204 has an arbiter (not illustrated) which selects among memory accesses for CPU writes, CPU reads, PCI/PCI-X writes, PCI/PCI-X reads, AGP reads, AGP writes, and dynamic memory refresh. Arbitration may be pipelined into a current memory cycle, which insures that the next memory address is available on the memory bus 105 before the current memory cycle is complete. This results in minimum delay, if any, between memory cycles. The memory interface and control 204 also is capable of reading ahead on PCI/PCI-X initiator reads when a PCI/PCI-X initiator issues a read multiple command, as more fully described in the PCI/PCI-X specifications.

The host/PCI bridge 206 controls the interface to the PCI/PCI-X bus 109. When the CPU 102 accesses the PCI/PCI-X bus 109, the host/PCI bridge 206 operates as a PCI/PCI-X initiator. When a PCI/PCI-X device is an initiator on the PCI/PCI-X bus 109, the host/PCI bridge 206 operates as a PCI/PCI-X target. The host/PCI bridge 206 contains base address registers for an AGP device target (not illustrated).

The AGP/PCI logic 218 comprises a PCI/PCI bridge 220, PCI data and control 208, AGP/PCI arbiter 216, AGP data and control 210, and AGP request/reply queues 212. The PCI data and control 208, AGP data and control 210, AGP/PCI arbiter 216 and AGP request/reply queues 212 interface to a universal AGP/PCI/PCI-X bus 207 having signal, power and ground connections (not illustrated) for complete implementation of signals defined in the AGP 1.0 and 2.0 interface standards or PCI or PCI-X standards, including 33 MHz, 66 MHz, 133 MHz, and 64 bit implementations thereof. An AGP/PCI control 214 may be used to select the personality function of the AGP/PCI logic 218 to be an AGP 1.0 or 2.0 compliant interface or to be a PCI or PCI-X compliant interface, depending on the desired purpose of the computer system 100. The AGP/PCI control 214 may be implemented in hardware jumper straps) or through software (configuration of personality registers in 208, 210 and 212). These personality registers are more fully defined in the AGP 1.0 and 2.0 specifications. The universal AGP/PCI/PCI-X bus 207 is adapted to connect to either or both AGP 1.0, AGP 2.0, and PCI/PCI-X connectors as more fully described herein below.

The PCI/PCI bridge 220 is connected between the PCI/PCI-X bus 109 and the PCI data and control 208. The PCI/PCI bridge 220 need not be a complete and fully functional PCI to PCI bridge when the AGP/PCI logic 218 is functioning as an AGP 1.0 or 2.0 compliant interface. In the AGP compliant mode, the purpose of the PCI/PCI bridge 220 is to allow the use of existing enumeration code (unmodified) to recognize and handle AGP 1.0, AGP 2.0, PCI, or PCI-X compliant devices residing on the AGP/PCI/PCI-X bus 207. The PCI/PCI bridge 220, for example, may be used in determining whether an AGP 1.0 or 2.0 device or a PCI or PCI-X device(s) is connected to the AGP/PCI/PCI-X bus 207 by bus enumeration during POST.

When selected as a PCI/PCI-X compliant interface, the AGP/PCI logic 218 functions with the same capabilities as the primary host/PCI bridge 206. In this case, the AGP/PCI logic 218 becomes a second host/PCI bridge and the AGP/PCI/PCI-X bus 207 becomes the second (additional) PCI/PCI-X bus in the computer system. The PCI/PCI-X bus 109 is the primary PCI/PCI-X bus and is assigned a logical bus number of zero. The additional PCI/PCI-X bus (AGP/PCI/PCI-X bus 207) may typically be assigned a logical bus number of one. It is contemplated, however, in the present invention that another embodiment thereof may present to the computer system 100 both PCI/PCI-X bus 109 and the additional PCI/PCI-X bus (universal bus 207) as a single logical bus number zero. This allows a single logical PCI/PCI-X bus to have more PCI connectors, i.e., more PCI cards on the same PCI bus number. Device arbitration and signal synchronization would be accomplished in the core logic 104 between the two host/PCI bridges.

In another embodiment when the AGP/PCI bus 207 is serving as an additional PCI/PCI-X bus, the PCI/PCI bridge 220 in combination with AGP/PCI logic 218 may be used as a full function PCI/PCI bridge between the PCI/PCI-X bus 109 and the AGP/PCI/PCI-X bus 207. In this embodiment of the present invention, transactions between the host bus 103 and the AGP/PCI/PCI-X bus 207 would have to go through both the host/PCI bridge 206 and the now fully functional PCI/PCI bridge 220.

Figure 2A:
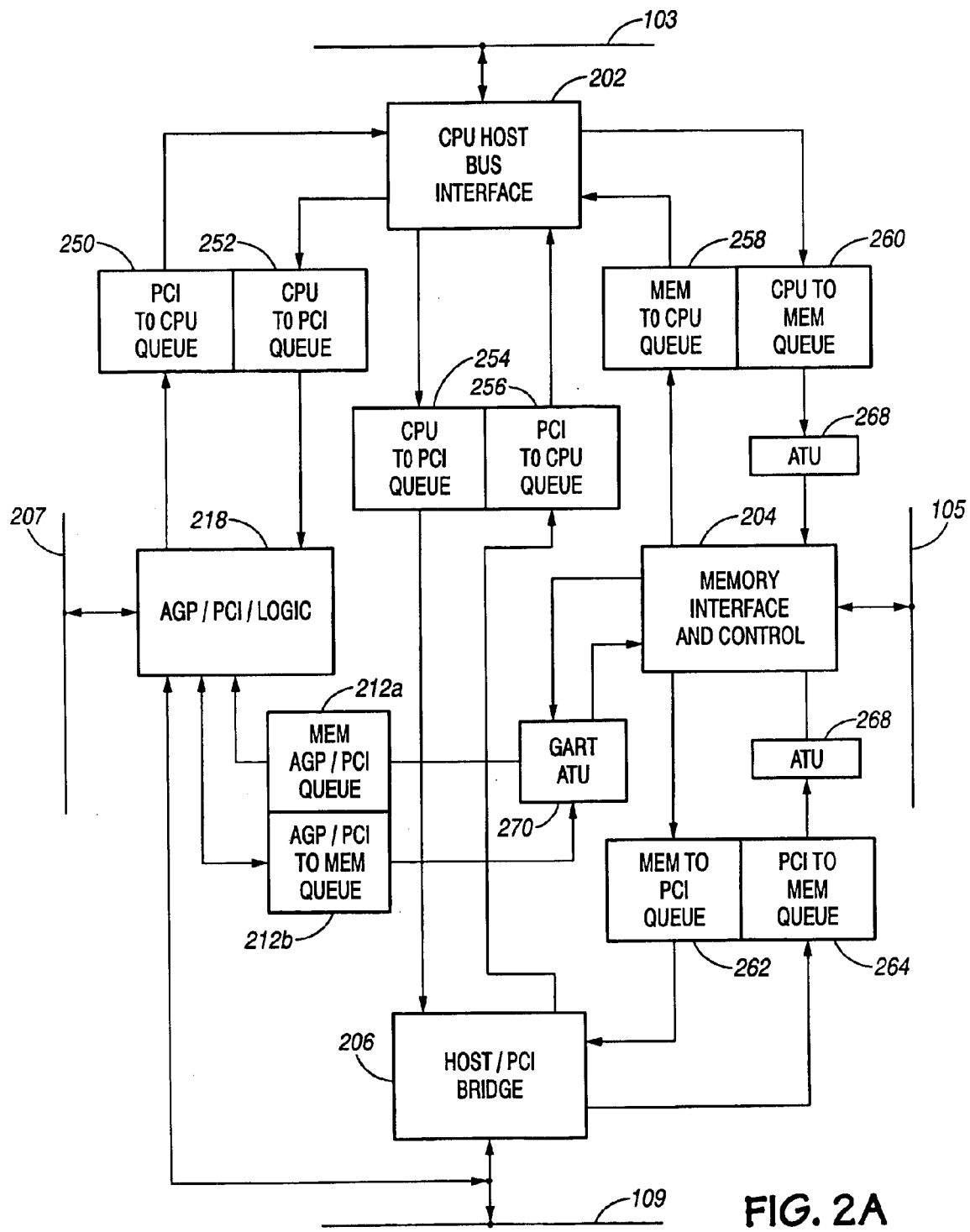
FIG. 2A is a data flow diagram of FIG. 2.

Referring now to FIG. 2A, a data flow block diagram of the core logic 104 of FIG. 2, according to the present invention, is illustrated. The core logic 104 communicates through the various queues, read registers, and other control signals (not illustrated). Separating the major function blocks (202, 204, 206 and 218) as illustrated and coupling these function blocks together with read and write queues allows for a significant amount of concurrency in the computer system.

There are ten address and data queues illustrated in FIG. 2A. The queues receiving information (address and data) from the CPU are: CPU to memory queue 260, CPU to PCI queue 254, and CPU to PCI queue 252. Data directed to the system memory (RAM 106) has the respective base addresses translated to the system memory address space by address translation units ("ATU") 268.

The queues receiving information directed to the CPU are: memory to CPU queue 258, PCI to CPU queue 256, and PCI to CPU queue 250. Memory to PCI queue 262 receives information from the memory interface and control 204 that is directed to the host/PCI bridge 206. PCI to memory queue 264 receives information from the host/PCI bridge 206 that is directed to the memory interface and control 204. Memory to AGP/PCI queue 212a receives information from the memory interface and control 204 that is directed to the AGP/PCI logic 218. AGP/PCI to memory queue 212b receives information from the AGP/PCI logic 218 that is directed to the memory interface and control 204. A graphic address remapping table ("GART") ATU 270 translates the AGP texture data addresses to and from the system memory address space. The GART ATU 270 has a memory address table as more fully defined in the AGP specification.

The CPU to memory queue 260 handles CPU 102 posted writes to the RAM 106. The CPU to PCI queue 254 handles CPU 102 writes to the primary PCI bus 109. The CPU to PCI queue 252 handles CPU 102 writes to either an AGP device, a PCI device, or APCI-X on the universal AGP/PCI/PCI-X bus 207.

The system memory (RAM 106) reads by the CPU 102 are queued in the memory to CPU queue 258. Reads from the PCI/PCI-X devices on the primary PCI/PCI-X bus 109 are queued in the PCI to CPU queue 256. Reads from the AGP device or PCI/PCI-X device(s) on the universal AGP/PCI/PCI-X bus 207 are queued in the PCI to CPU queue 250. With the queues 212a, 212b, 250, 252, the AGP/PCI logic 218 has the same capabilities as the host to PCI bridge 206 when configured as an additional host to PCI bridge.

Figure 3:
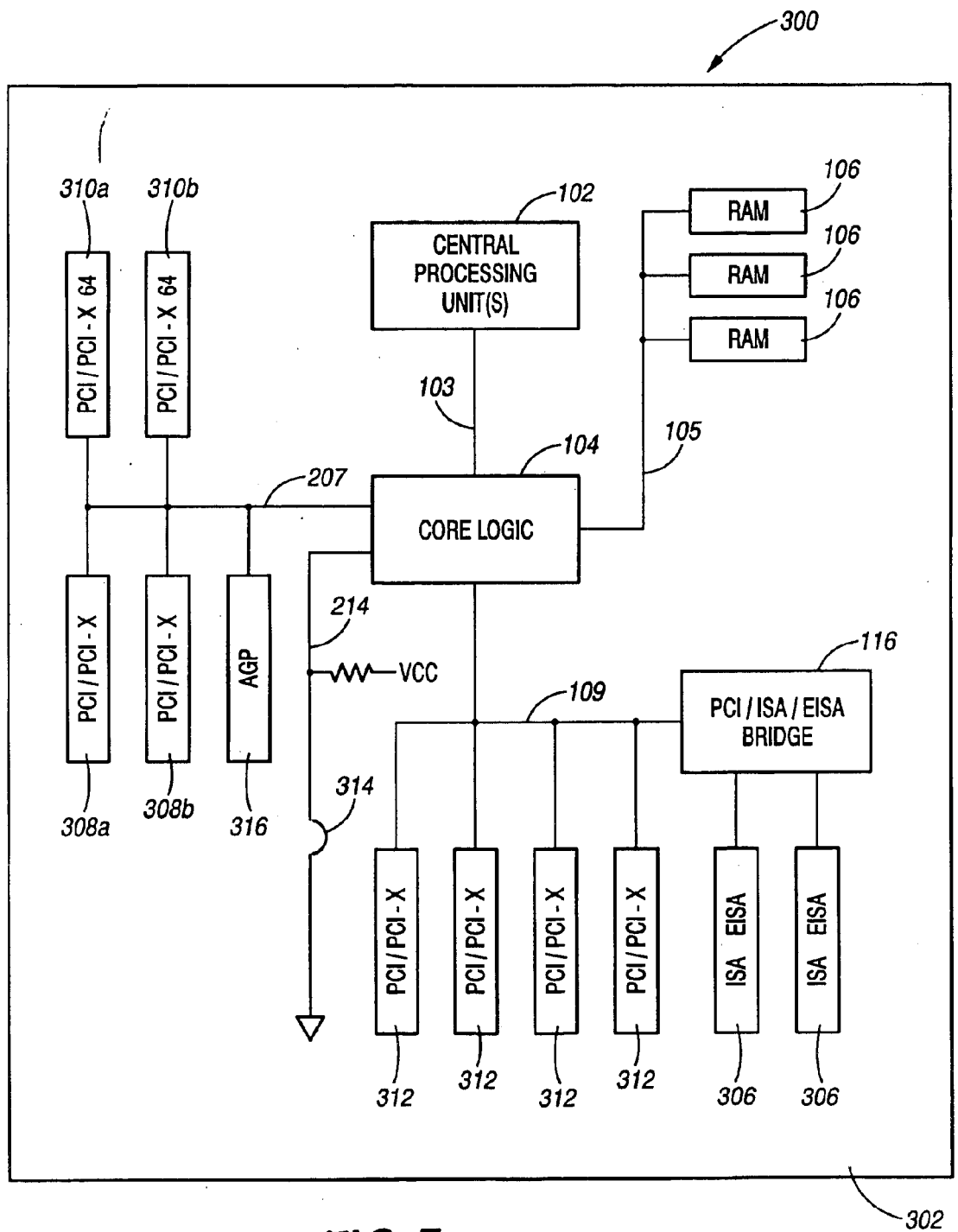
FIG. 3 is a schematic plan view of a computer system motherboard, according to the present invention.

Referring to FIG. 3, a schematic block diagram of a computer system motherboard is illustrated in plan view. The computer system motherboard 300 comprises a printed circuit board 302 on which components and peripheral card connectors are mounted thereto. The printed circuit board 302 comprises conductive printed wiring 304 which is used to interconnect the components and connectors. The conductive printed wiring (illustrated as buses 103, 105 109 and 207) may be arranged into signal buses having controlled impedance characteristics. On the printed circuit board 302 are core logic 104, CPU(S) 102, RAM 106, PCI/ISA/EISA bridge 116, ISA/EISA connector(s) 306, 32 bit PCI/PCI-X connectors 312 (primary PCI/PCI-X bus 109), 32 bit (33, 66, or 133 MHz) PCI/PCI-X connectors 308a and 308b, 64 bit PCI/PCI-X extension connectors 310a and 310b, and either an AGP 1.0 or AGP 2.0 connector 316. In one embodiment of the present invention, a printed circuit board 302a (not illustrated) has only the PCI/PCI-X connectors 308 and 310, but not the AGP connector 316. In a second embodiment, a printed circuit board 302b (not illustrated) has only the AGP connector 316, but not the PCI/PCI-X connectors 308 and 310. In a third embodiment, both the AGP connector 316 and PCI/PCI-X connectors 308 and 310 populate the printed circuit board 302.

The core logic 104 may be configured for either an AGP 1.0 or AGP 2.0 bus with the AGP connector 316 active, or a second PCI/PCI-X bus with PCI/PCI-X connectors 308a/310a and 308b/310b active. Hardware configuration jumper 314 may be utilized to select the core logic 104 interface AGP/PCI personality, or configuration registers within the core logic 104 may be set by software during system configuration or POST after enumerating the various computer system buses to determine what peripheral cards have been plugged into the system motherboard 300. A feature of the present invention allows automatic configuration of the AGP bus bridge if an AGP compliant card is detected in the AGP connector 316. Similarly, the additional PCI bus bridge is configured if a PCI/PCI-X card is detected in one or more of the PCI/PCI-X cards connectors 308, or 308 and 310. Mechanical and/or electrical interlocking is contemplated so that only the AGP bus bridge or the additional PCI/PCI-X bus bridge can be activated for a given system configuration.

Figure 4:
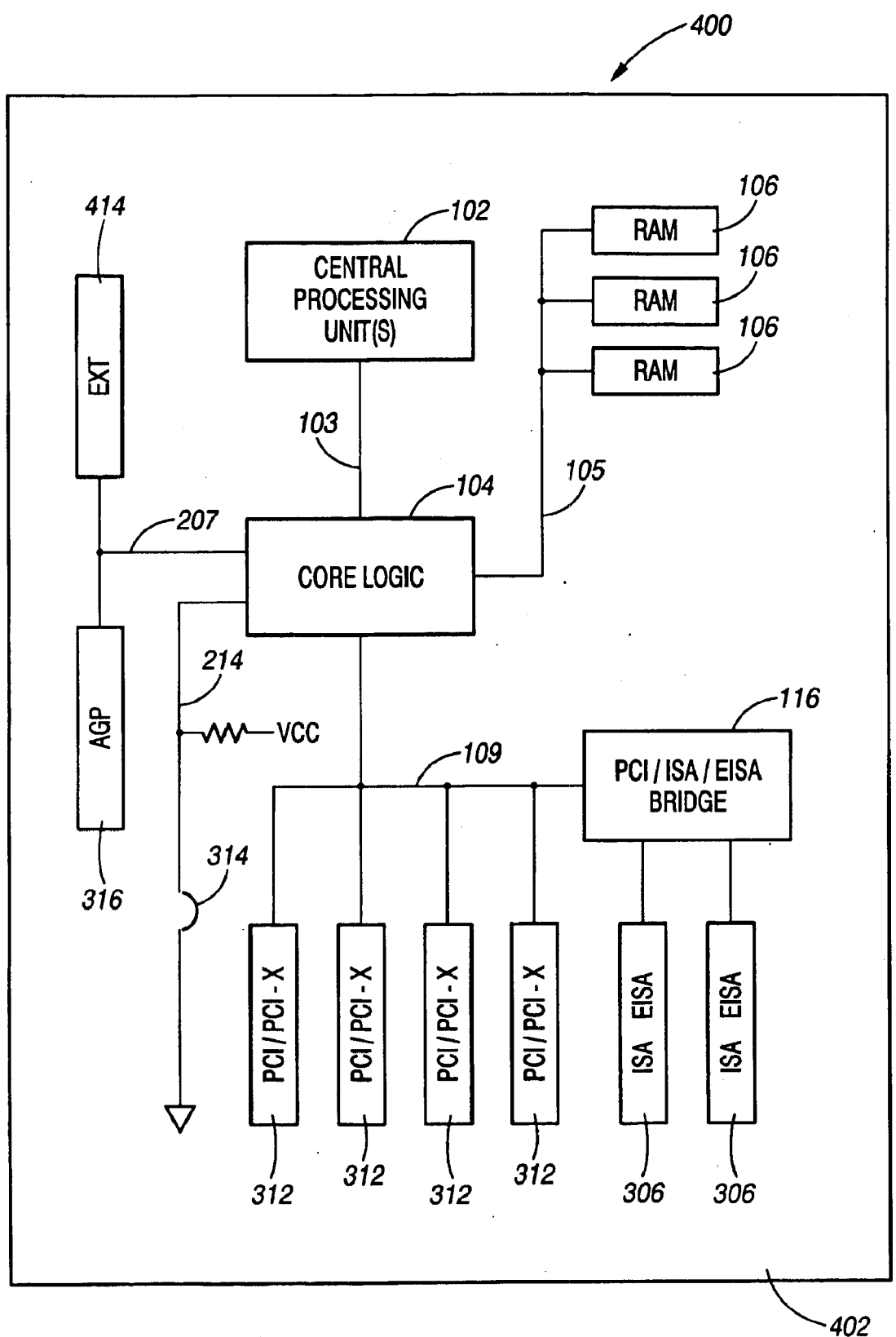
FIG. 4 is a schematic plan view of another computer system motherboard, according to the present invention.
Figure 5:
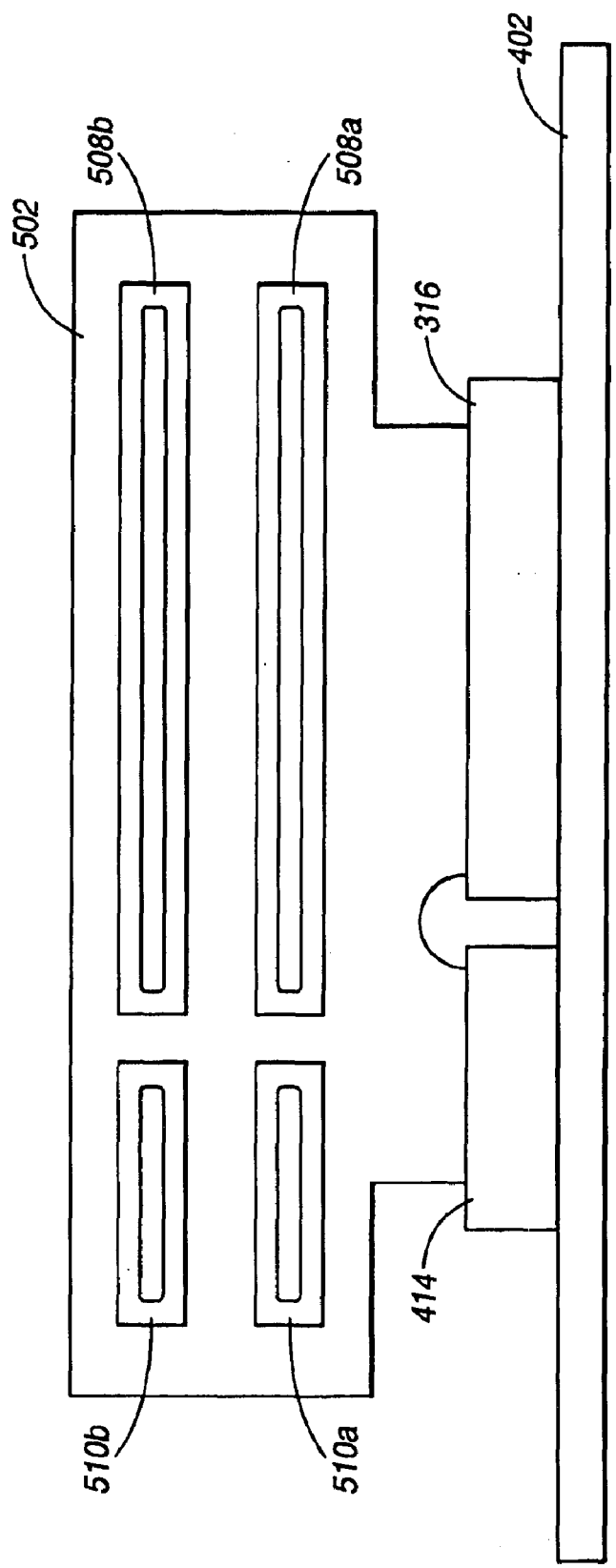
FIG. 5 is a schematic elevational view of a plug-end daughterboard with PCI connectors thereon, according to the present invention.

Referring now to FIGS. 4 and 5, a schematic block diagram of another computer system motherboard is illustrated in plan view and a daughterboard adapter is illustrated in elevational view, respectively. The motherboard 400 comprises a printed circuit board 402 adapted for the components and connectors disclosed above (FIG. 3) and, in addition, an extension connector 414 is provided on the printed circuit board 402 which has all of the PCI/PCI-X only signals from the universal AGP/PCI/PCI-X bus 207. A daughterboard 502 is adapted to plug into the AGP connector 316 and the extension connector 414. The daughterboard 502 has PCI/PCI-X connectors 508a, 508b, 510a and 510b thereon which may be configured for a full PCI/PCI-X bus implementation (33, 66 or 133 MHz, 64 bit). The PCI/PCI-X connectors 312 may be utilized with the PCI/PCI-X bus 109 (FIG. 1), and the new PCI/PCI-X connectors 508 and 510 on the daughterboard 502 may be used as a second PCI/PCI-X bus for additional PCI/PCI-X cards, such as NICs. Configuration of the core logic 104 may be by hardware jumper 314 or software control during system configuration or POST as disclosed above.

Figure 6:
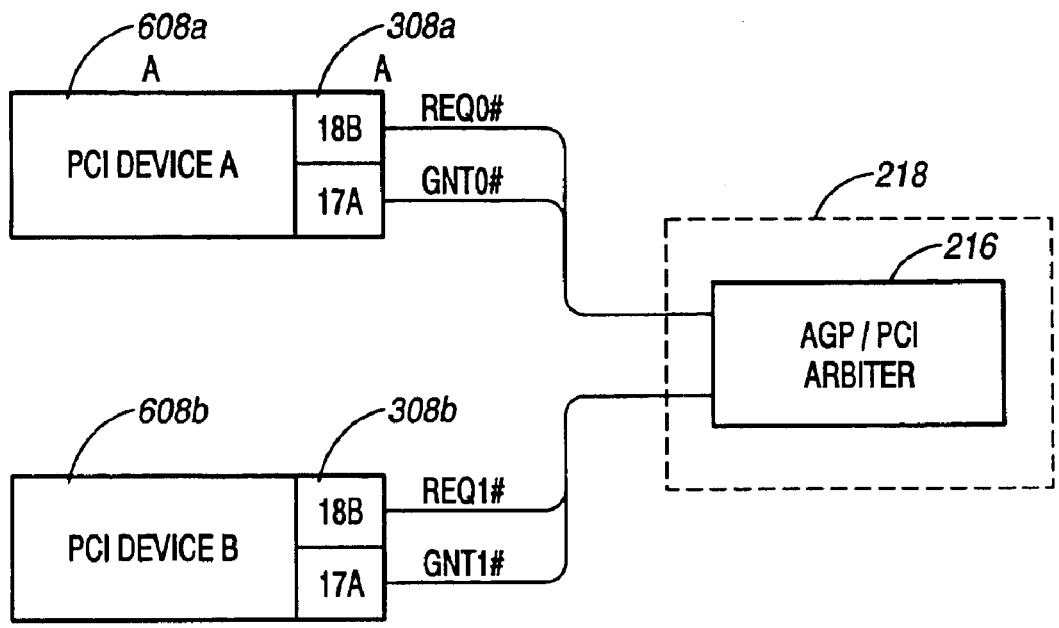
FIG. 6 is a schematic block wiring diagram of a portion of the embodiment of the present invention according to FIG. 3.

Referring now to FIG. 6, a schematic block wiring diagram of a portion of the embodiment of the present invention according to FIG. 3 is illustrated. Each PCI/PCI-X device card inserted into the PCI/PCI-X connectors 508a and 508b require request (REQ#) and grant (GNT#) signals. According to the PCI and PCI-X specifications, a PCI/PCI-X device is selected and allowed to become the bus initiator when it asserts its respective REQ# signal onto the PCI bus and the PCI arbiter acknowledges the PCI/PCI-X device bus initiator request by asserting the respective GNT# signal back to device requesting the PCI/PCI-X bus. In the multiple use core logic 104 of the present invention, a plurality of request and grant signals are available for either an AGP bus device or additional PCI/PCI-X bus devices 608a and 608b. This is partially illustrated by PCI/PCI-X connector 308a connected to REQ0# and GNT0# signals, and PCI connector 308b connected to REQ1# and GNT1# signals all from the AGP/PCI logic 218 and AGP/PCI arbiter 216. Thus, the multiple use core logic chip set of the present invention may be configured for a computer system having either an AGP compliant bus or an additional 33, 66, or 133 MHz (32 or 64 bits) PCI/PCI-X bus depending only upon the configuration of the printed circuit board 302. In this way one multiple use core logic chip set may be utilized for many differently configured computer systems from simple portable and consumer personal computers to high end workstations and network servers.

Indication of whether a device inserted into any of the PCI/PCI-X connectors supports the PCI-X protocol may be provided by detecting the state of one of the pins line (i.e., the PCIXCAP pin) of the PCI/PCI-X connector. For example, if the PCIXCAP pin is open, PCI-X at 133 MHz is supported. If the pin is tied to ground through a resistor, PCI-X at 66 MHz is supported. If the pin is tied directly to ground, only conventional PCI is supported.

Figure 7:
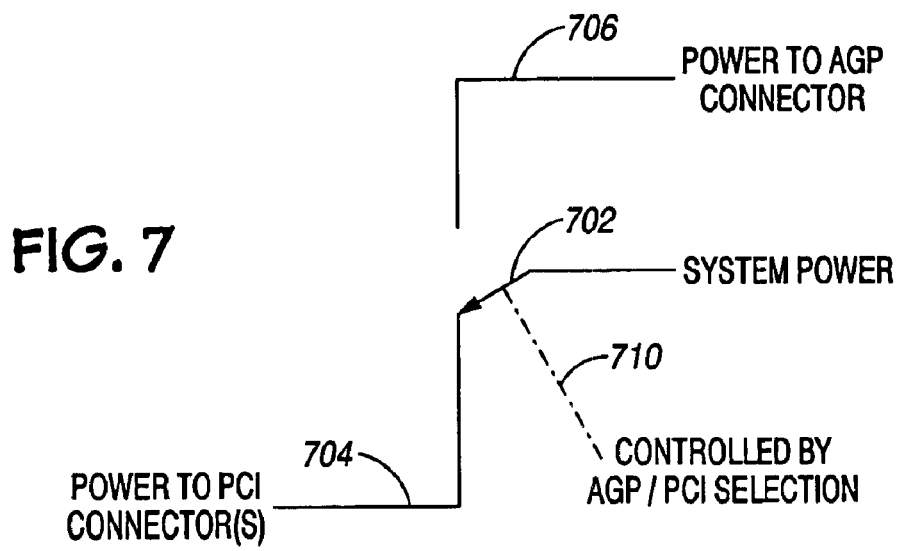
FIG. 7 is a schematic diagram of a power switch according to an embodiment of the present invention.

Referring now to FIG. 7, a schematic diagram of a power switch according to the present invention is illustrated. A switch 702 is controlled by the AGP/PCI power selection means 710. A power line 704 connects to the power terminals of the PCI/PCI-X connector(s) 308. A power line 706 connects to the power terminals of the AGP connector 316. The switch 702 applies power to either the power line 704 or the power line 706 when the PCI/PCI-X or AGP mode is selected, respectively. Controlling whether the power goes to the PCI/PCI-X connector(s) 308 or AGP connector 316 may prevent a malfunction of the computer system if both a PCI/PCI-X card and an AGP card are inadvertently plugged into the computer system motherboard simultaneously. The AGP/PCI power selection means 710 may be controlled from the hardware configuration jumper 314 or by software control. The switch 702 maybe comprised of bipolar transistors, power MOSFETS (metal oxide semiconductor field effect transistors), relay contacts and the like.

Figure 8A:
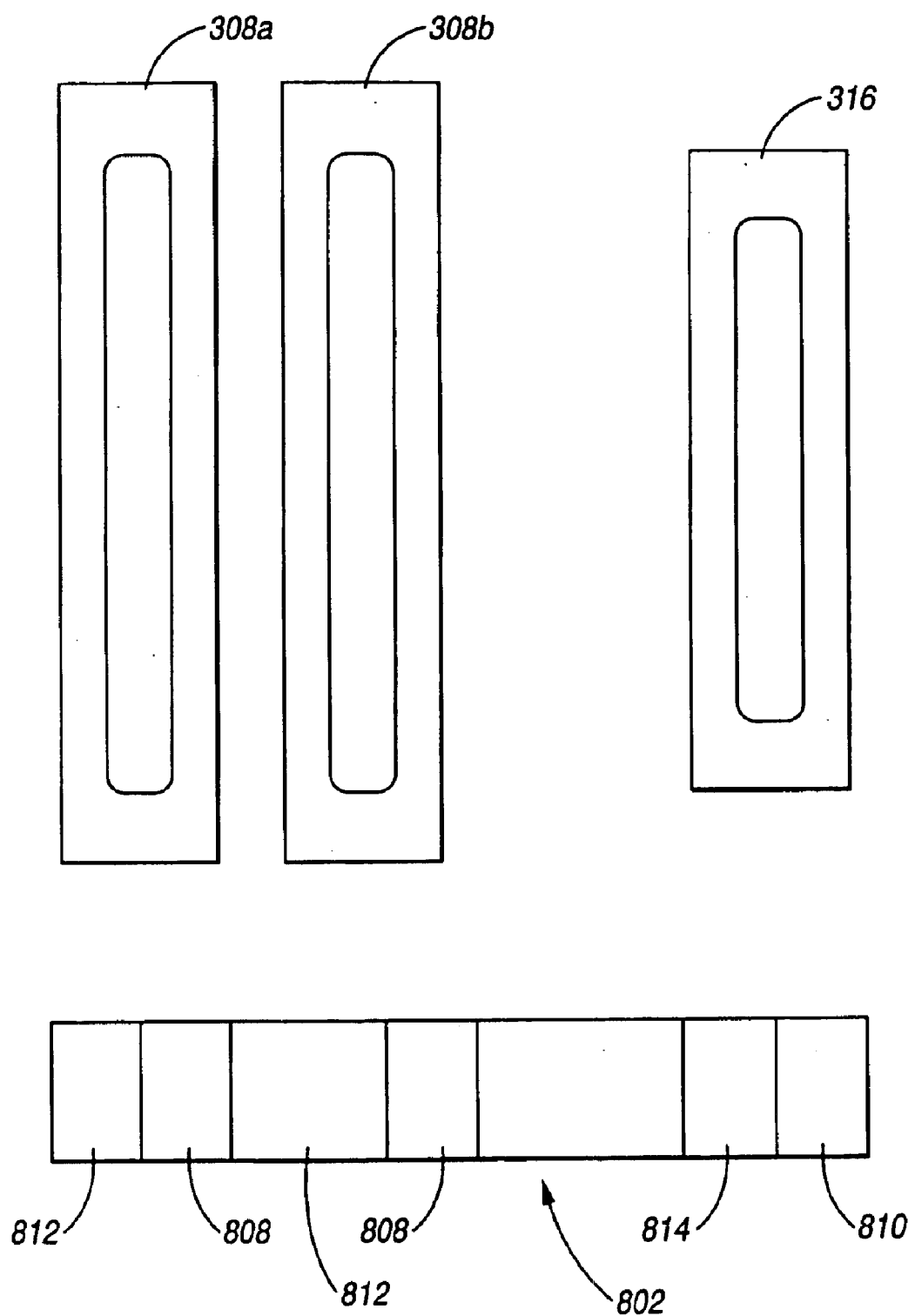
FIG. 8A is a plan view of a portion of the motherboard illustrated in FIG. 3 illustrating a card interlock according to an embodiment of the present invention.
Figure 8B:
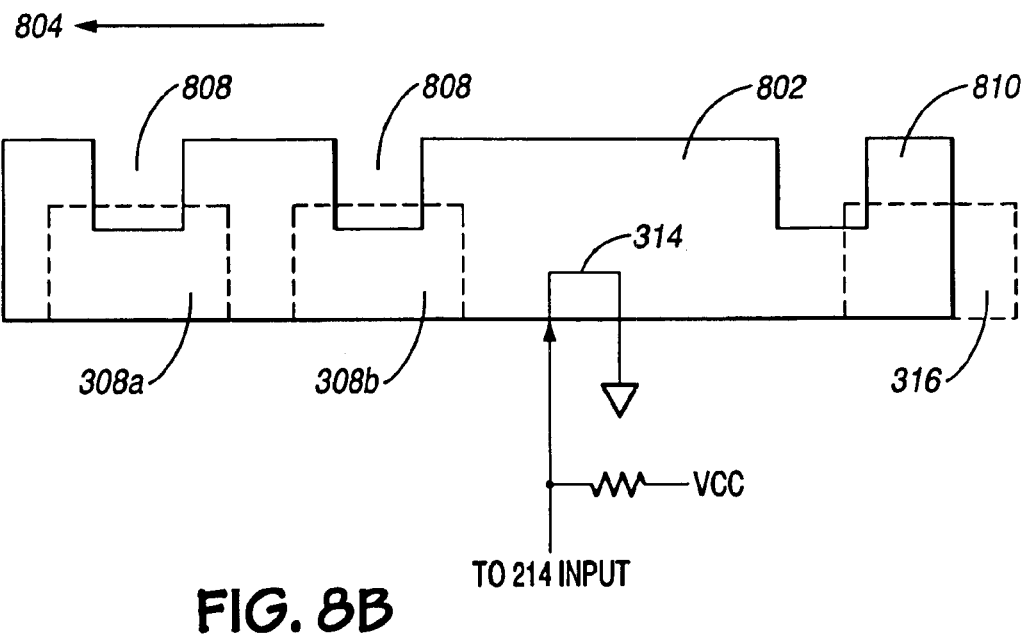
FIGS. 8B and 8C are schematic elevational views of the card interlock of FIG. 8A.
Figure 8C:
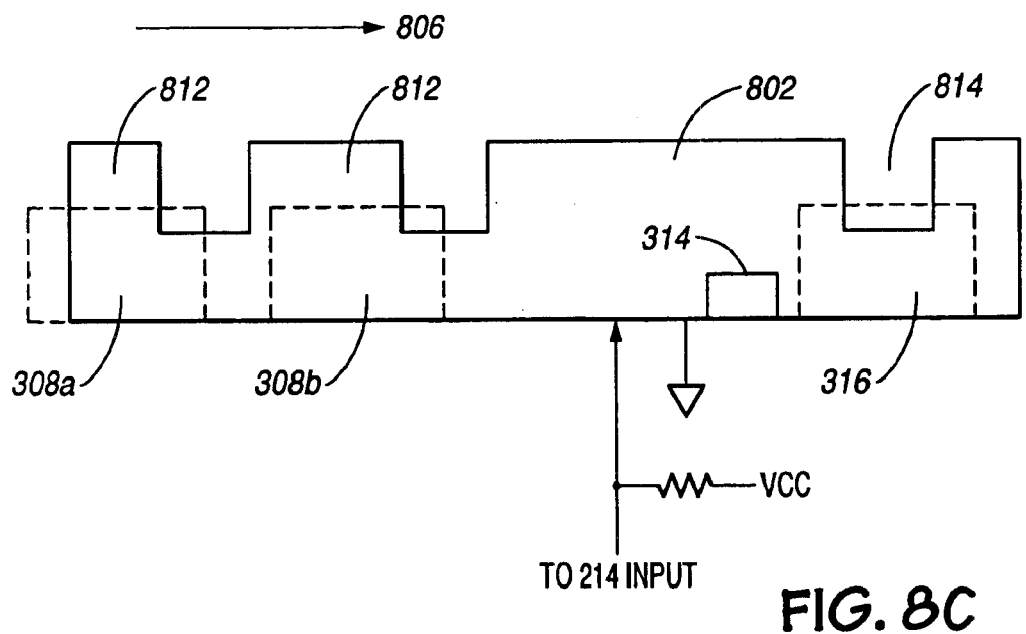

Referring now to FIGS. 8A, 8B and 8C, FIG. 8A is a plan view of a card interlock on a portion of the motherboard illustrated in FIG. 3, and FIGS. 8B and 8C are schematic elevational views of the card interlock and the AGP connector and PCI/PCI-X connector(s) illustrated in FIG. 8A. A mechanical interlock 802 is used to prevent the insertion of an AGP device card when in position 804 illustrated in FIG. 8B, or a PCI/PCI-X device card when in position 806 illustrated in FIG. 8C. The interlock 802 is positioned perpendicular to the long axis of the connectors 308 and 316, and slides between positions 804 and 806 depending on whether the computer system is configured for an additional PCI/PCI-X bus or an AGP bus, respectively. When the interlock is in position 804 (FIG. 8B), grooves 808 are positioned to allow insertion of PCI/PCI-X device cards (not illustrated) into the PCI/PCI-X connectors 308, and ridge 810 is positioned to prevent insertion of an AGP device card into the AGP connector 316. When the interlock is in position 806 (FIG. 8C), ridges 812 are positioned to prevent insertion of PCI/PCI-X device cards (not illustrated) into the PCI/PCI-X connectors 308, and groove 814 is positioned to allow insertion of an AGP device card into the AGP connector 316.

The jumper 314 (FIGS. 3 and 4) may be integral with the interlock 802 so that when the interlock 802 is in position 804, contact is made by the jumper 314 such that a ground signal (logic 0) is generated to input 214 for configuring the core logic 104 as an additional PCI/PCI-X interface. When the interlock 802 is in position 806, contact is not made by the jumper 314 such that a VCC signal (logic 1) is generated to input 214 for configuring the core logic 104 as an AGP interface.

The interlock 802 may be positioned by manual means (hand or tool) or may be positioned by an electric solenoid actuator (not illustrated) and operated by the computer system. The solenoid actuator may mechanically maintain its last position when the computer system is powered down and may only move to a new position when directed by the computer system hardware. The computer system hardware being controlled by either the jumpers 314 or software. Another means of slidably moving the interlock 802 may be a worm gear drive and motor having limit switches indicating the positions 804 and 806.

Figure 9:
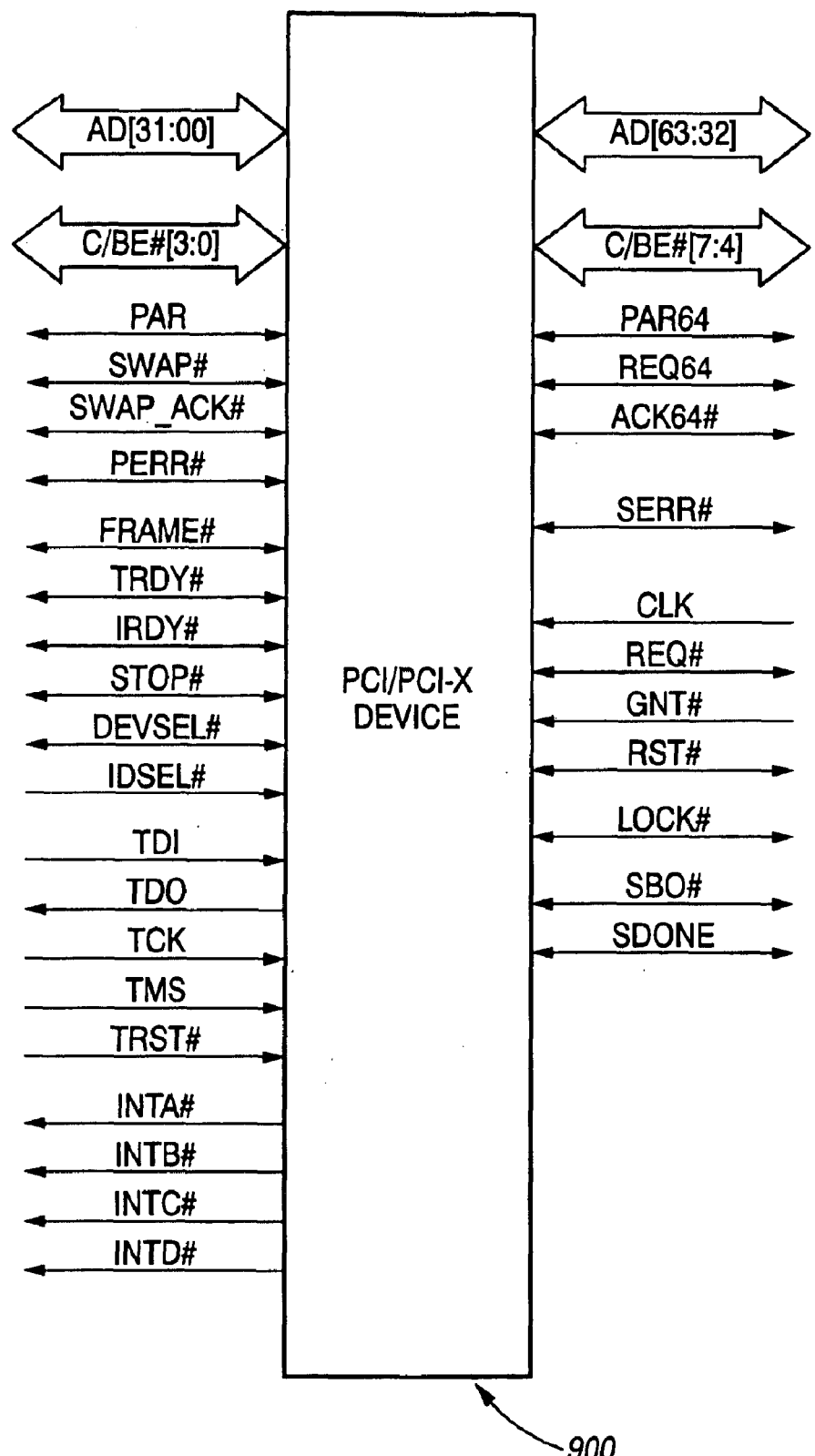
FIG. 9 is a schematic block diagram of signals to and from a PCI/PCI-X device, according to the present invention.

Referring now to FIG. 9, a schematic block diagram of signals to and from a PCI/PCI-X device, according to an embodiment of the present invention, is illustrated. The PCI/PCI-X device is generally represented by the numeral 900. The signals indicated for the device 900 are more fully defined in the PCI and PCI-X Specifications except for new signals SWAP# and SWAP_ACK#. The signal SWAP# herein indicates that the initiator is either requesting that a data transaction be over the upper bus only, or that the initiator is capable of transferring data over just the upper bus.

It is noted that a PCI-X device also implements a PCIX-CAP signal to indicate that the device supports the PCI-X protocol. The level of the PCIXCAP signal is indicative of the bus frequency (i.e., 66 or 133 MHz) supported. Signals to and from an AGP device are similar, with any differences in the functions of the signals being described in the AGP specifications. In addition to the PCI/PCI-X signals, however, the AGP signals include a PIPE# signal (pipelined request); SBA[7:0], which is a sideband address port that provides an additional bus to pass requests from the master to the target; RBF# and WBF# signals (read buffer full, write buffer full); ST[2.0], which is a status bus to provide information from the arbiter to the master; AD_STB, which is a bus strobe signal to provide timing for 2×data transfer mode on AD[15:0]; AD_STB1, which is a bus strobe signal to provide timing for 2×transfer mode on AD[3:16]; and SB_STB, which is a strobe signal to provide timing for SBA[7:0]. Further, AGP transactions do not support the PERR# and PAR signals. Thus, when the AGP bus is used for AGP transactions (i.e., advanced graphics applications), the fault-tolerant feature described below may be disabled by software. When the AGP bus is used for standard I/O transactions (e.g., PCI or PCI-X), the fault-tolerant feature may be enabled. Detection of the type of device connected to the AGP/PCI bus has been described above. Signals to and from an AGP device are similar, with any differences in the functions of the signals being described in the AGP specification.

With reference again to FIG. 9, when both SWAP# and REQ64# are asserted by the bus initiator, the response from the target determines whether the data phase transaction will be over the entire 64-bit data-width upper and lower buses (ACK64# asserted but not SWAP_ACK#), the lower bus (neither ACK64# nor SWAP_ACK# asserted), or the upper bus (SWAP_ACK# asserted but not ACK64#). When SWAP# is asserted but not REQ64# is asserted, the initiator is requesting an upper bus data phase transfer only. When neither SWAP# nor REQ64# is asserted, the initiator is requesting a lower bus data phase transfer only. The target will indicate how it will effect a data phase transfer by asserting just DEVSEL# for a lower bus data phase transfer only, DEVSEL# and ACK64# for a 64-bit data-width data phase transfer, or DEVSEL# and SWAP_ACK# for an upper bus data phase transfer only.

Figure 10:
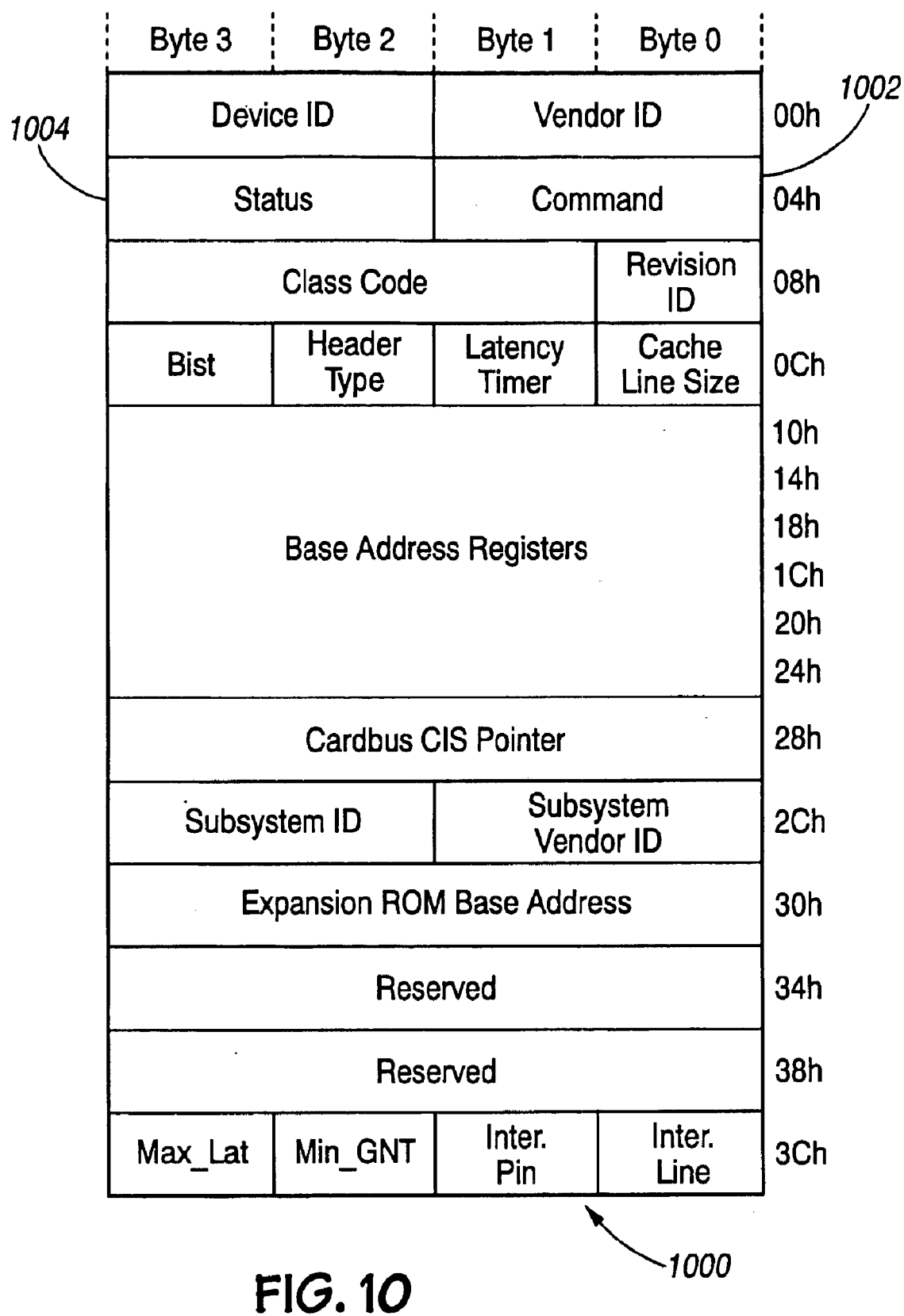
FIG. 10 is a schematic diagram of a PCI/PCI-X device configuration space header.

Referring now to FIG. 10, a schematic diagram of a PCI device configuration space header is illustrated. The PCI device configuration space header is generally represented by the numeral 1000. The PCI device configuration space header 1000 depicts the layout of a Type 00h predefined portion of a 256-byte Configuration Space of the PCI/PCI-X device 300. The register fields in the configuration space header 1000 are more fully defined in the PCI Specification. Differences in the function of these registers when a device is initialized in PCI-X mode are described in the PCI-X specification. AGP devices have a similar configuration space header. Differences between the PCI configuration space header and the AGP configuration space header are detailed in the AGP 1.0 and AGP 2.0 specifications. The present invention may utilize additional bits in the Command register 1002 and Status register 1004 (offset addresses 04h and 06h, respectively). Device drivers and other computer system software may read and/or write to the Command register 1002 and Status register 1004 for determining the status of a prior action (read a register), or controlling a future action (write to a register).

Figure 11:
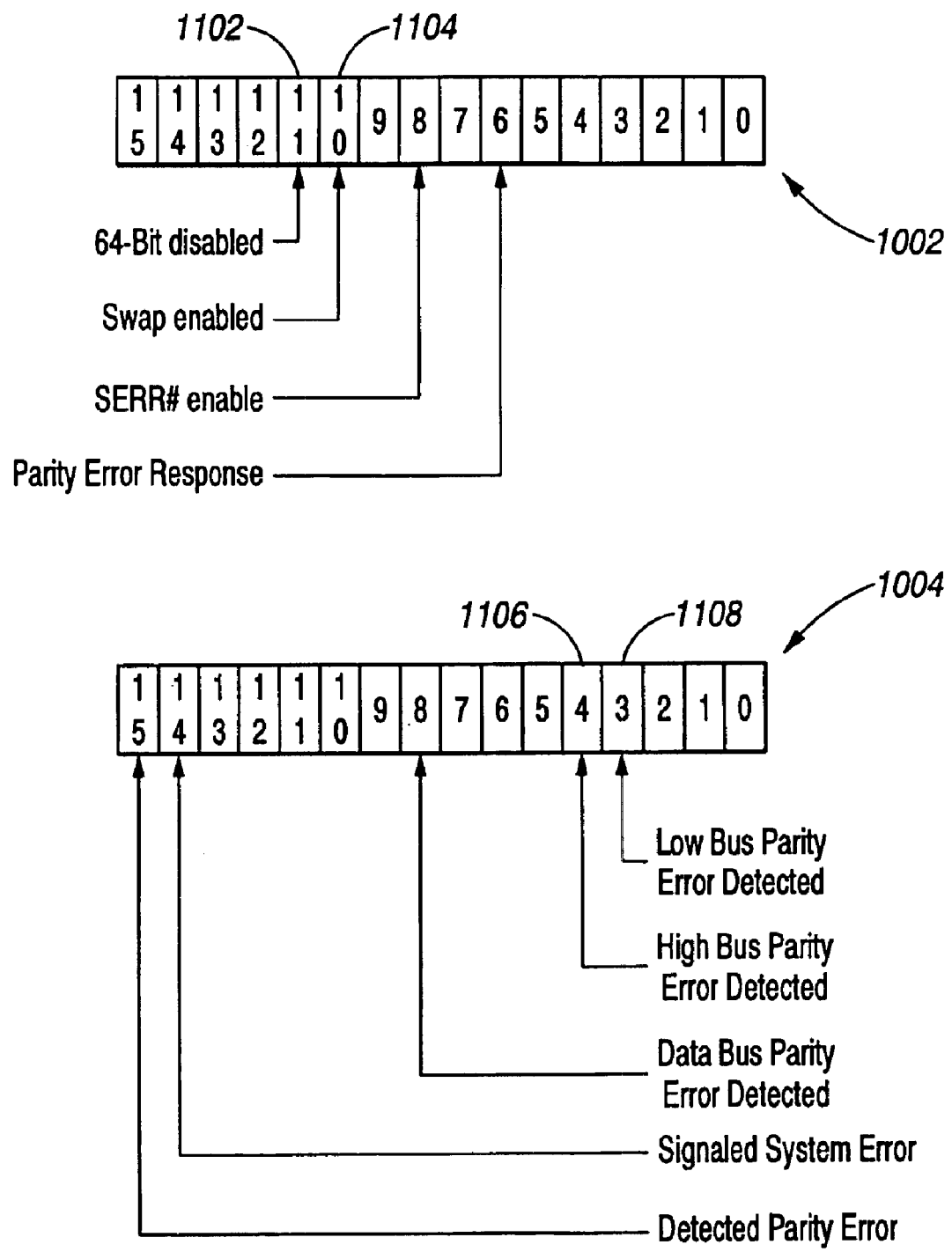
FIG. 11 is a schematic diagram of command and status registers of the configuration space header of FIG. 10.

Referring to FIG. 11, schematic diagrams of an exemplary command register 1002 and status register 1004 are illustrated. In the embodiment illustrated, the command register 1002 comprises 16 bits, some predefined by the PCI, PCI-X and AGP 1.0 and 2.0 specifications, the others reserved for future use. The present invention may utilize two of these reserved bits as a 64-bit disabled bit, represented by the numeral 1102, and Swap enabled bit, represented by the numeral 1104. For example, the 64-bit disabled bit 1102 may be set or cleared by the device software driver so that when the device is an initiator during a transaction, it will attempt to transact with a target over either a 64-bit data-width (bit 1102 cleared) or a 32-bit data-width (bit 1102 set) (i.e., REQ64# will be asserted or not asserted). The Swap enabled bit 1104 may be set or cleared by the device software driver so that when the device is an initiator during a transaction, it may transact with a target over the upper 32-bit data-width bus when bit 1104 is set (i.e., SWAP# will be asserted or not asserted).

The 64-bit disabled bit 1102 may also be set or cleared by the device software driver so that when the device is a target during a transaction, it will acknowledge a transaction with the initiator over either a 64-bit data-width (bit 1102 cleared) or a 32-bit data-width (bit 1102 set) (i.e., ACK64# will be asserted or not asserted, respectively). The Swap enabled bit 1104 may also be set or cleared by the device software driver so that when the device is the target during a transaction, it may transact with the initiator over only the upper 32-bit data-width bus when bit 1104 is set (i.e., SWAP_ACK# will be asserted or not asserted, and ACK64# will not be asserted).

The exemplary status register 1004 comprises 16 bits, some predefined by the PCI, PCI-X, AGP 1.0 and 2.0 specifications, the others reserved for future use. The present invention may utilize two of these reserved bits as a High Bus Parity Error Detected bit, represented by the numeral 1106, and a Low Bus Parity Error Detected bit, represented by the numeral 1108. The High Bus Parity Error Detected bit 1106 indicates that a parity error was detected on the upper 32-bit bus. Likewise, the Low Bus Parity Error Detected bit 1108 indicates that a parity error was detected on the lower 32-bit bus. These status bits are available for reading by the device software drivers, and the information represented therein may be used by the computer system operating software. These status bits may also be used by the device logic to inhibit a 64-bit data-width transaction and either utilize the lower bus or the upper bus for a 32-bit data-width transaction. It is contemplated herein that many different combinations and numbers of command and status bits may be utilized with the present invention.

Figure 12A:
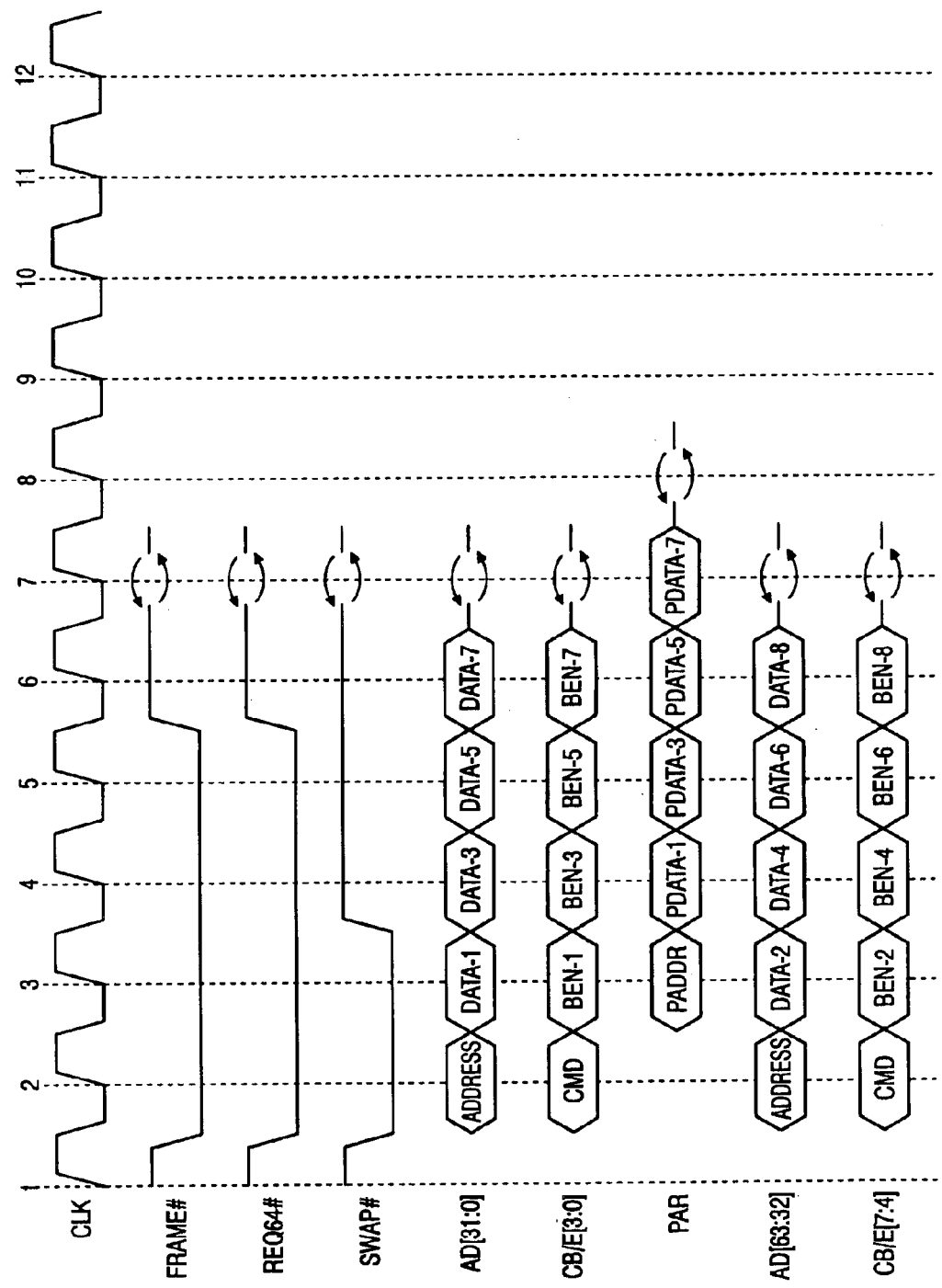
FIGS. 12–18 are schematic timing diagrams of various PCI bus operations, according to the present invention.
Figure 12B:
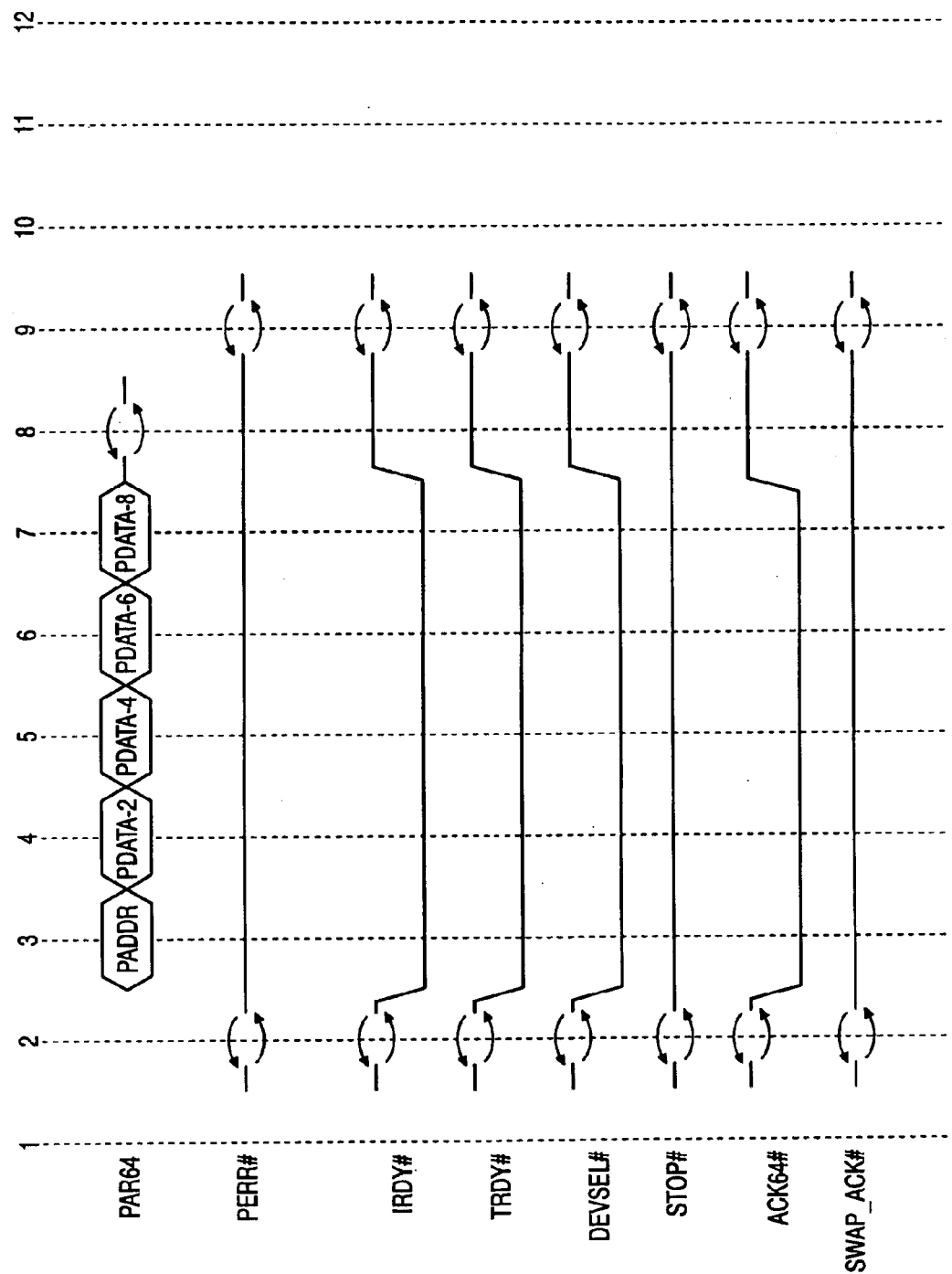

Referring now to FIG. 12, a schematic timing diagram of a normal 64-bit data-width write transaction on a PCI or AGP bus is illustrated, according to the present invention. A schematic timing diagram for a normal 64-bit data width PCI-X write transaction will be described below with reference to FIG. 19.

With reference to FIG. 12, assume that an initiator has arbitrated for and obtained (owns) the universal bus (not illustrated). During clock 1 (CLK1), FRAME#, REQ64#, and SWAP# are asserted by the initiator. There are no predisposed restrictions set in the initiator or target (i.e., 64-Bit disabled bit 502 or Swap enabled bit 504 are not set). Also during CLK1, the transaction address is asserted on both the AD[31:0] and AD[63:32] buses, and the transaction command is asserted on both the CB/E[3:0] and CB/E[7:0] buses. Applying the transaction address and command during the address phase of the transaction redundantly to both the lower and upper buses allows the target to determine whether one or both of the buses has a fault by calculating whether there exists a parity error for the transaction address on either or both of the buses, as disclosed more fully below.

Once the target decodes its address, it will assert DEVSEL#, and may assert ACK64# which indicates that a 64-bit data-width transaction during the data phase may proceed. Once IRDY# and TRDY# are asserted, data may be transferred from the initiator to the target during the data phase write transaction. Since SWAP_ACK# was not asserted by the target, the initiator may dessert SWAP# since it serves no further purpose in the instant transaction. The last data transfer is indicated by FRAME# being deasserted.

The initiator calculates values for PAR and PAR64, and asserts them one clock after the respective address or data values, so that an even parity is generated in conjunction with the combination of the AD[31:0] and CB/E[3:0] buses, and the AD[63:32] and CB/E[7:3] buses, respectively. The target uses the number of 1's received on the AD[31:0] bus, CB/E[3:0] bus and PAR to verify that an even parity was received on the lower bus, and the number of 1's received on the AD[63:32] bus, CB/E[7:4] bus and PAR64 to verify that an even parity was received on the upper bus. During the address phase, if the target does not calculate an even parity for both the upper and lower buses, it may assert SERR#. In the example illustrated in FIG. 12, there is no parity error(s) during either the address or data phases of the write transaction.

Figure 13A:
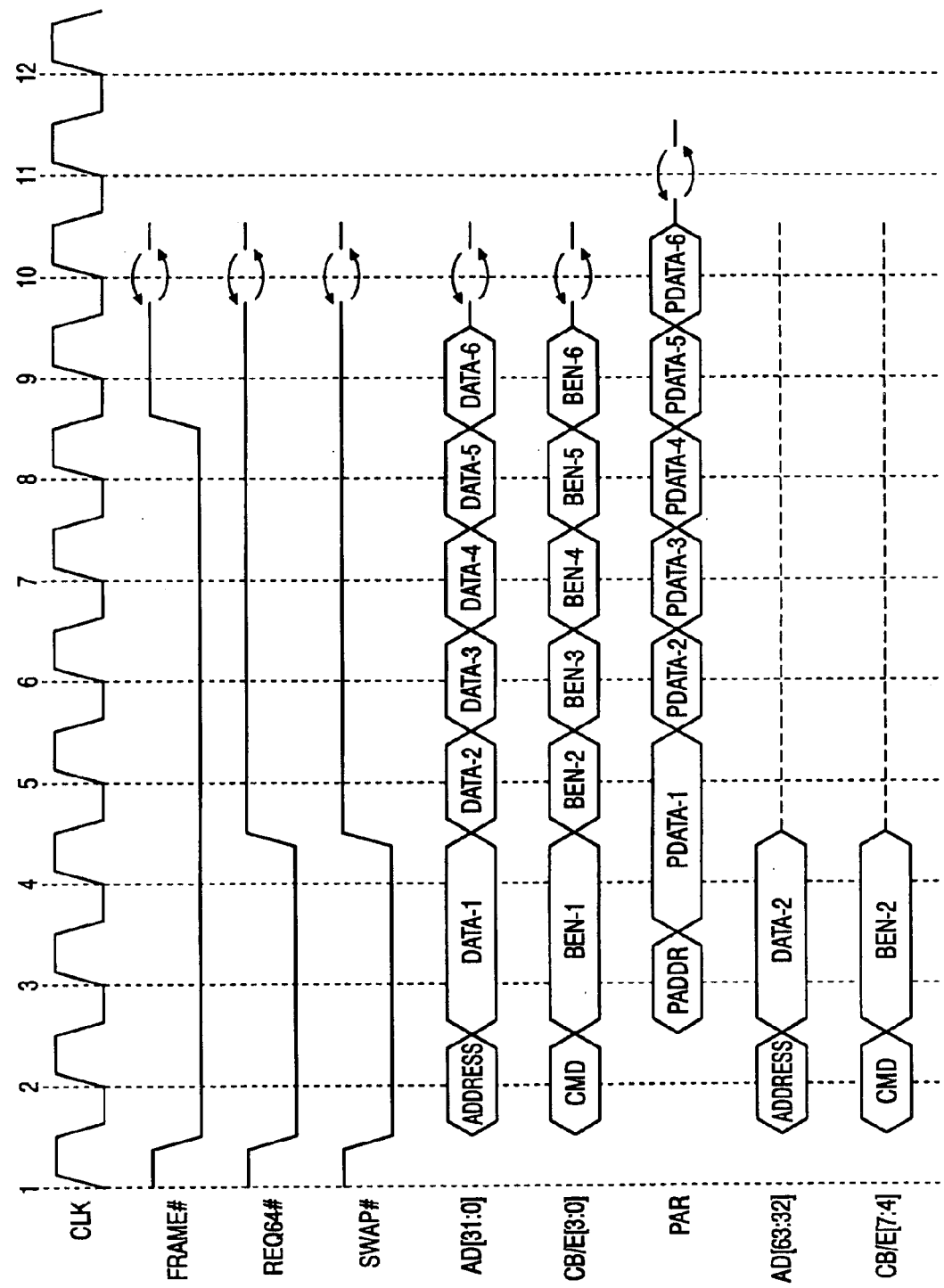
Figure 13B:
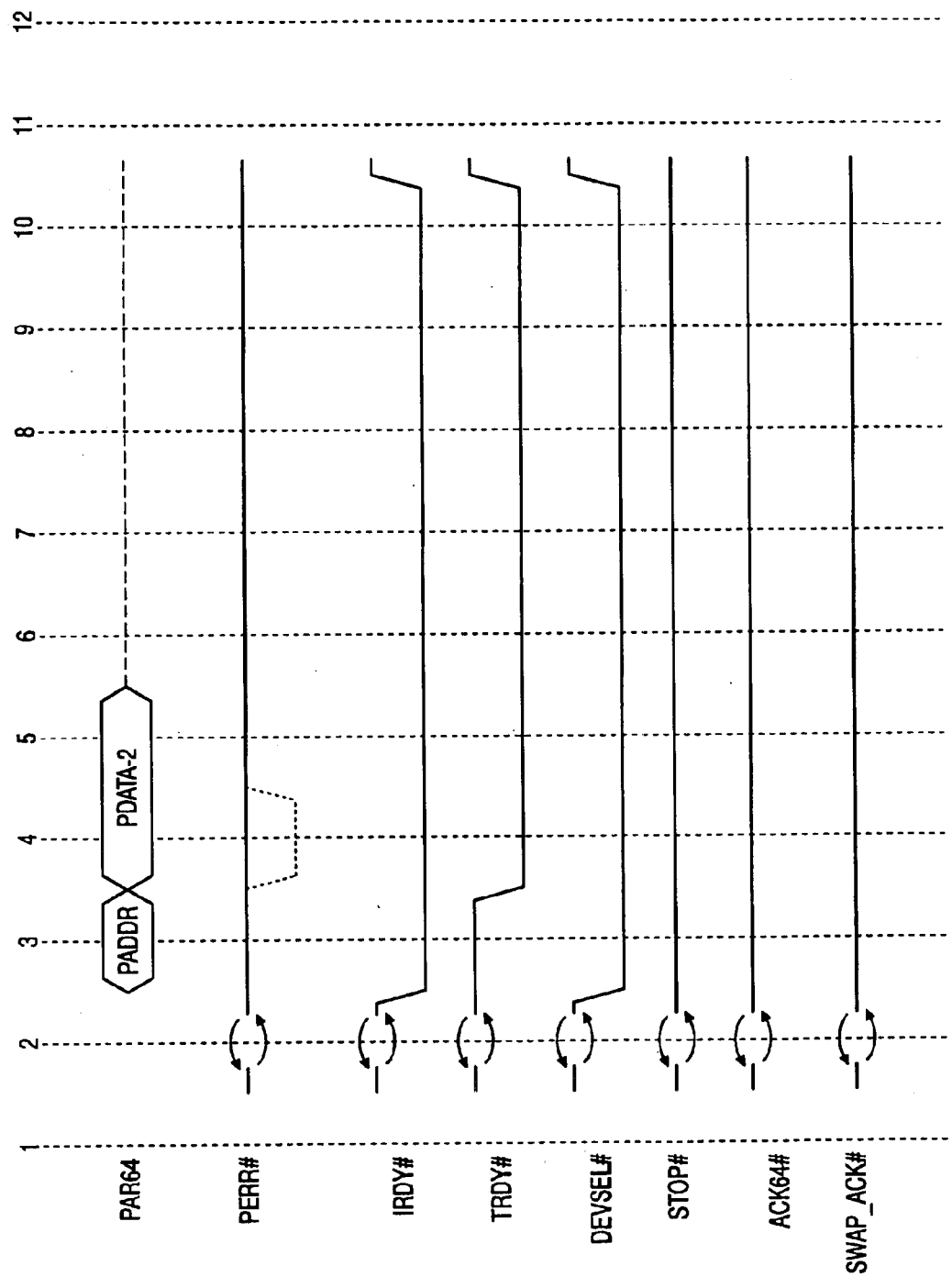

Referring now to FIG. 13, a schematic timing diagram is illustrated of a write transaction on a PCI/AGP bus, the write transaction having a wait state inserted by the target and an address parity error detected on the upper bus. The transaction illustrated in FIG. 13 begins as described above for the transaction illustrated in FIG. 12. The target, however, inserts a wait state by not asserting TRDY# until after CLK 2 so that the target may determine whether a parity error exists on one or both of the upper and lower buses during the address phase. A parity error on the lower bus is based on an incorrect number of 1's on the combination of the AD[31:0] bus, CB/E[3:0] bus, and PAR. A parity error on the upper bus is based on an incorrect number of 1's on the combination of the AD[63:32] bus, CB/E[7:4] bus, and PAR64.

For the example illustrated in FIG. 13, an address parity error on the upper bus is assumed. The target may use the address parity error information to control its transaction setup response to the initiator. Since the address parity error was on the upper bus, the target neither asserts ACK64# nor SWAP_ACK# (64-Bit disabled bit 1102 may also be set), and asserts TRDY# at CLK 4. This tells the initiator to transfer data on the lower bus only. If no data phase parity error(s) is detected by the target on the lower bus, then the write transaction proceeds to completion. The present invention, thus, dynamically configures the functional data path for the write transaction without having to request a Retry or Abort. The present invention may also issue a Retry or Abort, and the 64-Bit disabled bit 1102 may be set in the target. Then when the initiator starts a new transaction with this target, neither ACK64# nor SWAP_ACK# will be asserted by the target (the 64-bit disabled bit 1102 was previously set).

Since neither ACK64# nor SWAP_ACK# were asserted by the target when TRDY# is asserted, the initiator transfers data only on the lower bus. The data initially asserted by the initiator on the upper bus (data-2) is repeated on the lower bus during CLK 5. The last data transfer is indicated by FRAME# being deasserted at CLK 9. REQ64# and SWAP# are deasserted after CLK 4 by the initiator once it has been determined that data transfers will occur over only the lower bus.

Figure 14A:
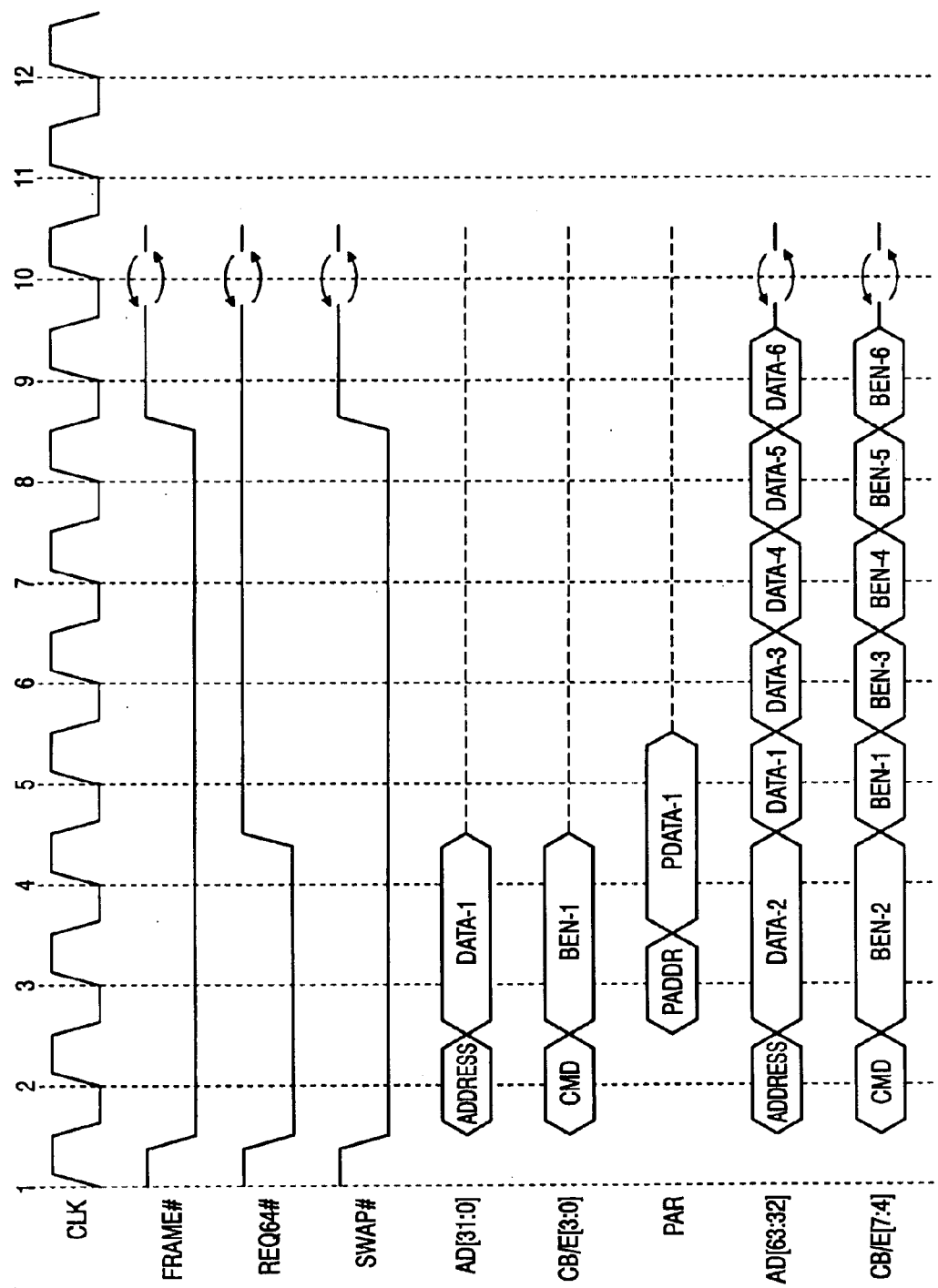

Referring now to FIG. 14, a schematic timing diagram is illustrated of a write transaction and a PCI/AGP bus, the write transaction having a wait state inserted by the target and an address parity error detected on the lower bus. The transaction illustrated in FIG. 14 begins as described above for the transaction illustrated in FIG. 12. The target, however, inserts a wait state by not asserting TRDY# until after CLK 2 so that the target may determine whether a parity error exists on one or both of the upper and lower buses during the address phase. A parity error on the lower bus is based on an incorrect number of 1's on the combination of the AD[31:0] bus, CB/E[3:0] bus, and PAR. A parity error on the upper bus is based on an incorrect number of 1's on the combination of the AD[63:32] bus, CB/E[7:4] bus, and PAR64.

For the example illustrated in FIG. 14, an address parity error on the lower bus is assumed. The target may use the address parity error information to control its transaction setup response to the initiator. Since the address parity error was on the lower bus, the target asserts SWAP_ACK# but not ACK64# (Swap enabled bit 1104 may also be set), and asserts TRDY# at CLK 4. This tells the initiator to transfer data on the upper bus only. If no data parity error(s) is detected by the target on the upper bus, then the write transaction proceeds to completion. The present invention, thus, dynamically configures the functional data path for the write transaction without having to request a Retry or Abort. The present invention may also issue a Retry or Abort after setting the 64-Bit disabled bit 502 and/or Swap enabled bit 1104 in the target. Then when the initiator starts a new transaction with this target, SWAP_ACK# will be asserted but not ACK64# (the Swap enabled bit 1104 was previously set).

Since SWAP ACK# was asserted (ACK64# deasserted) by the target when TRDY# is asserted, the initiator transfers data only on the upper bus. The data initially asserted by the initiator on the lower bus (data-1) is repeated on the upper bus during CLK 5. The last data transfer is indicated by FRAME# being deasserted at CLK 9. REQ64# is deasserted after CLK 4 by the initiator once it has been determined that data transfers will occur over only the upper bus. Thus, the present invention adds only one wait state (one clock time) when determining if an address parity error exists and then dynamically configures the functional data path for the data phase write transaction.

Figure 15A:
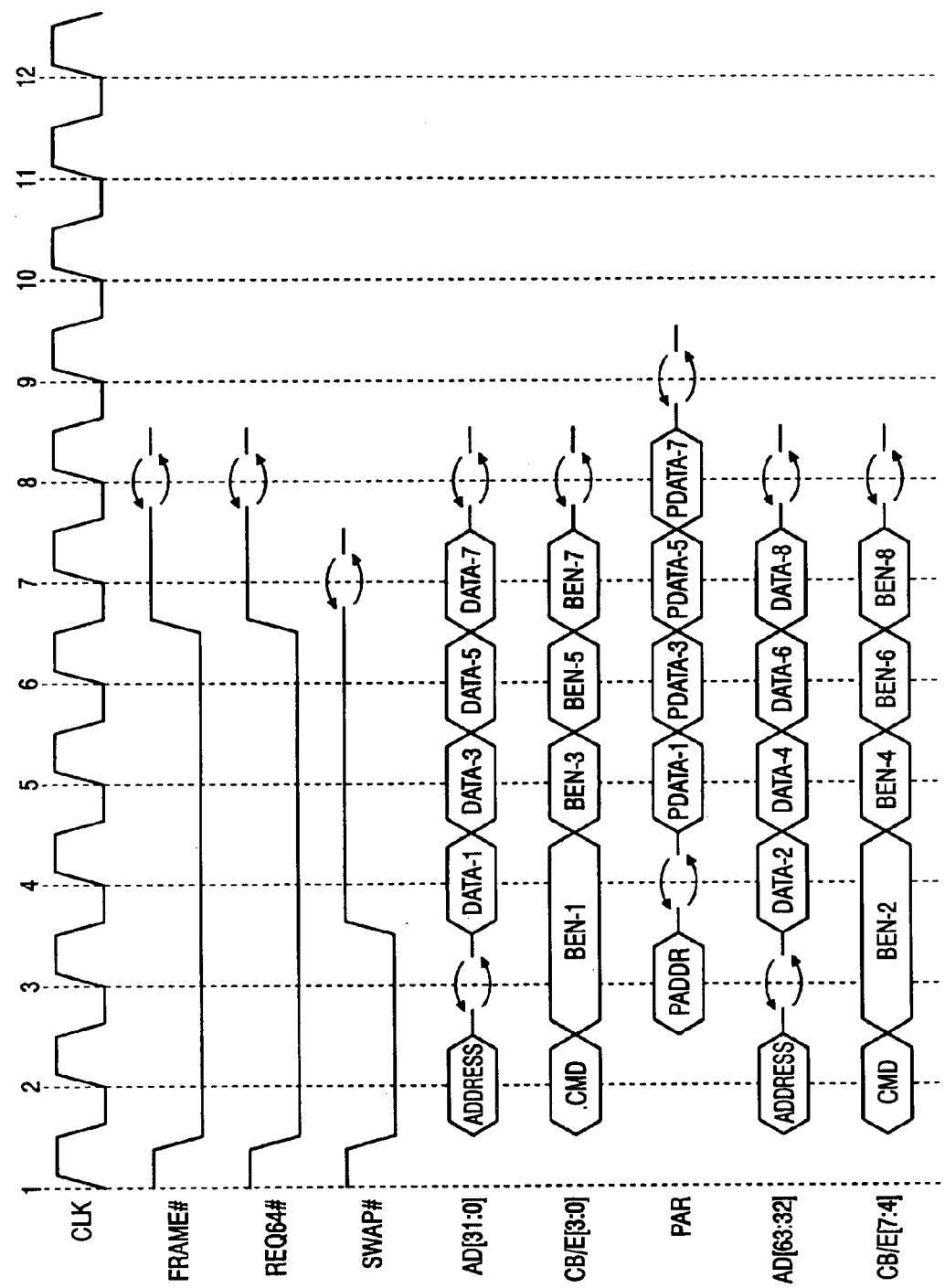
Figure 15B:
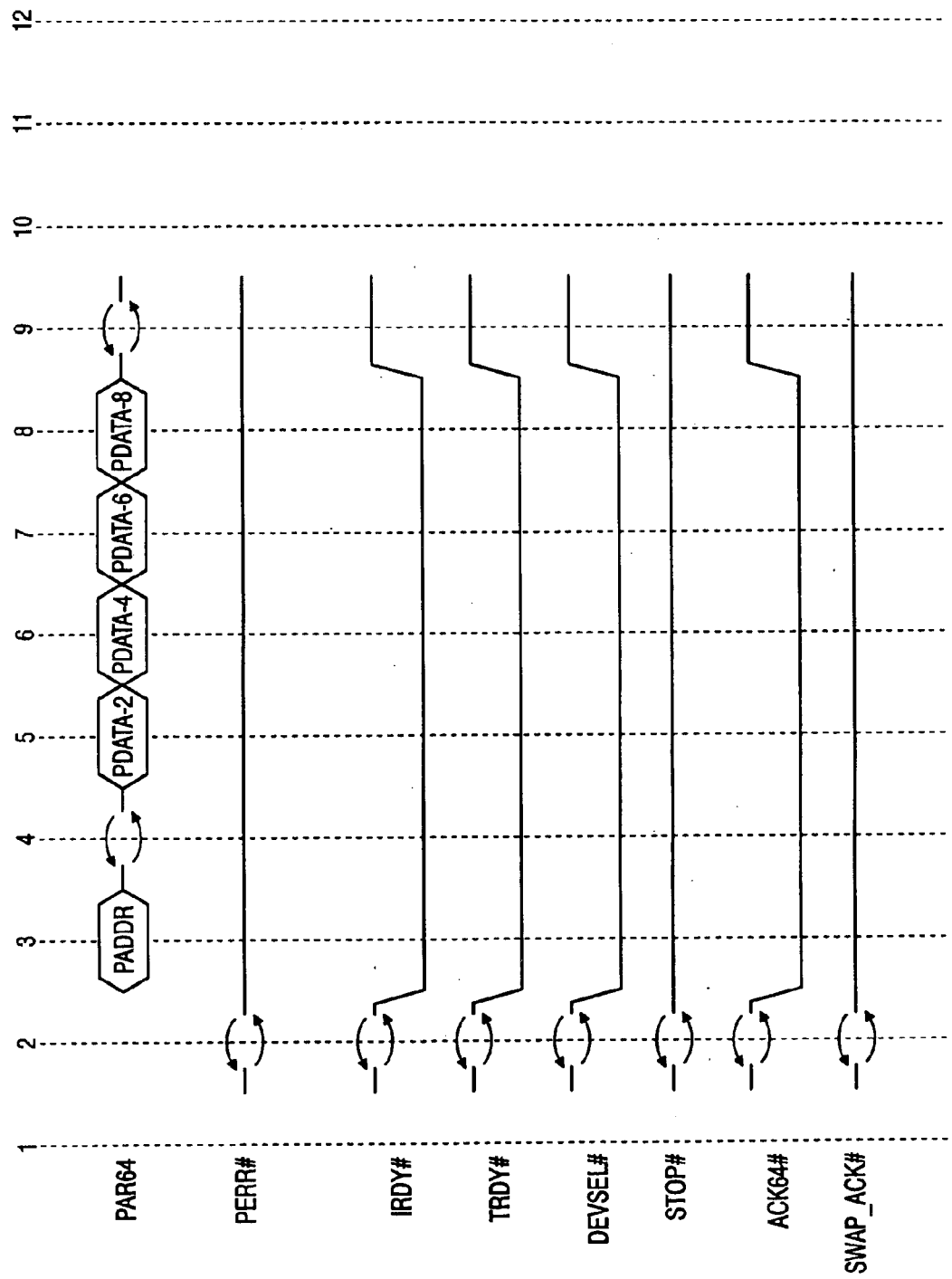

Referring now to FIG. 15, a schematic timing diagram of a normal 64-bit data-width read transaction for a PCI/AGP bus is illustrated, according to the present invention. Assume that an initiator has arbitrated for and obtained (owns) the bus (not illustrated). Now during PCI clock 1 (CLK1), FRAME#, REQ64#, and SWAP# are asserted by the initiator. There are no predisposed restrictions set in the initiator or target (i.e., 64-Bit disabled bit 502 or Swap enabled bit 504 are not set). Also during CLK 1, the transaction address is asserted on both the AD[31:0] and AD[63:32] buses, and the transaction command is asserted on both the CB/E[3:0] and CB/E[7:0] buses. Applying the transaction address and command during the address phase of the transaction redundantly to both the lower and upper buses allows the target to determine whether one or both of the buses has a fault by calculating whether there exists a parity error for the transaction address on either or both of the buses, as disclosed above for the example illustrated in FIG. 12. If a parity error exists on both of the PCI/AGP buses during the address phase, SERR# may be asserted according to the PCI Specification.

Once the target decodes its address, it will assert DEVSEL# and may assert ACK64# which indicates that a 64-bit data-width transaction during the data phase may proceed. Once IRDY# and TRDY# are asserted, data may be transferred from the target to the initiator during the data phase read transaction. Since SWAP_ACK# was not asserted by the target, the initiator may dessert SWAP# since it serves no further purpose in the instant transaction. The last data transfer is indicated by FRAME# being deserted.

The initiator calculates values for PAR and PAR64 for the address phase, and the target calculates values for PAR and PAR64 during the data phase. PAR and PAR64 are asserted one clock after their respective address or data values, so that an even parity is generated in conjunction with the combination of the AD[31:0] and CB/E[3:0] buses, and the AD[63:32] and CB/E[7:3] buses, respectively. During the address phase, the target uses the number of 1's received on the AD[31:0] bus, CB/E[3:0] bus and PAR to verify that an even parity was received on the lower bus, and number of 1's received on the AD[63:32] bus, CB/E[7:4] bus and PAR64 to verify that an even parity was received on the upper bus. During the data phase, the initiator uses the number of 1's received on the AD[31:0] bus, CB/E[3:0] bus and PAR to verify that an even parity was received on the lower bus, and number of 1's received on the AD[63:32] bus, CB/E[7:4] bus and PAR64 to verify that an even parity was received on the upper bus. If the initiator does not calculate an even parity for both the upper and lower buses, it will assert PERR#. In the example illustrated in FIG. 15, there is no parity error(s) during either the address or data phases of the PCI/AGP read transaction.

Figure 16A:
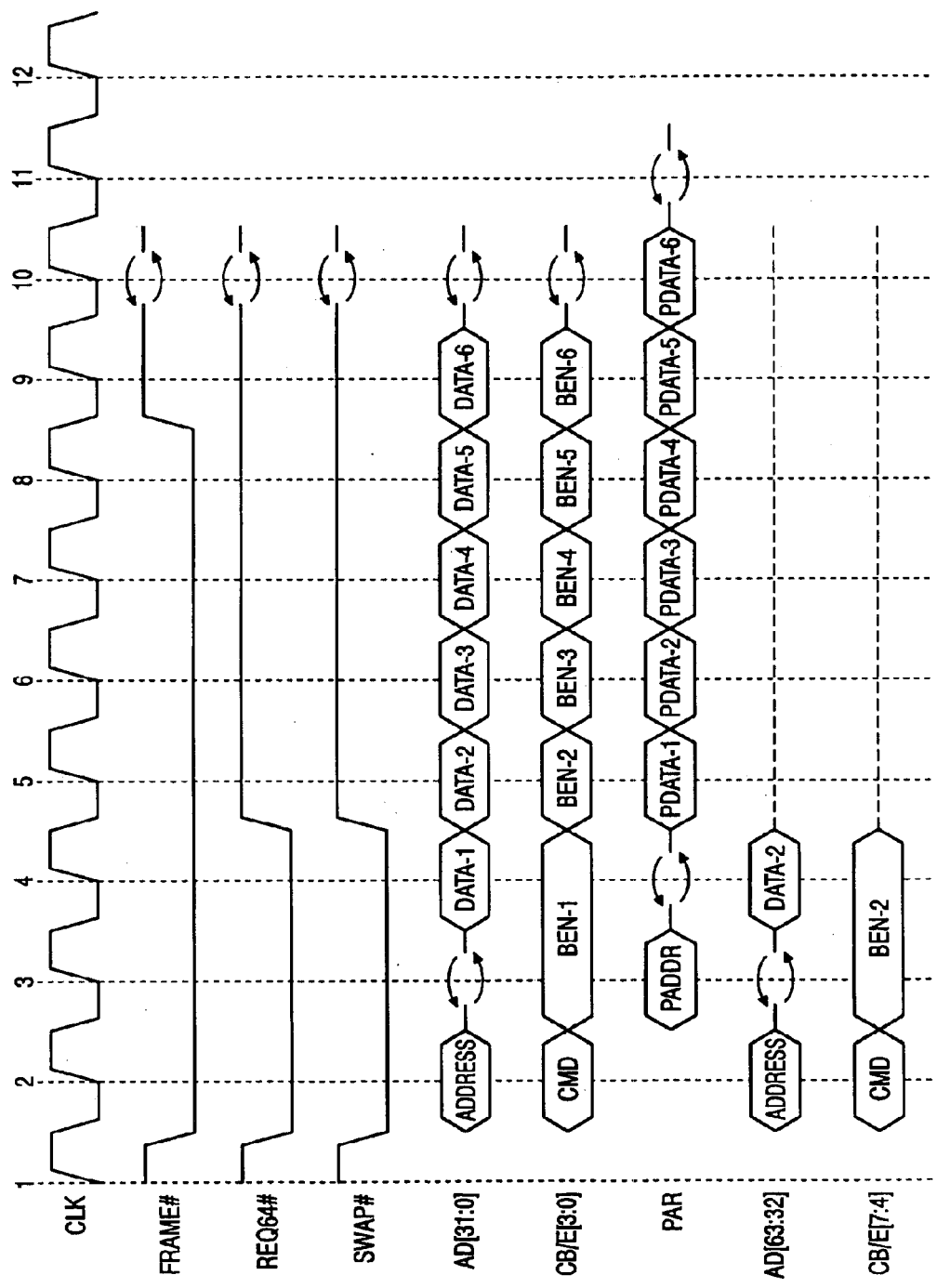
Figure 16B:
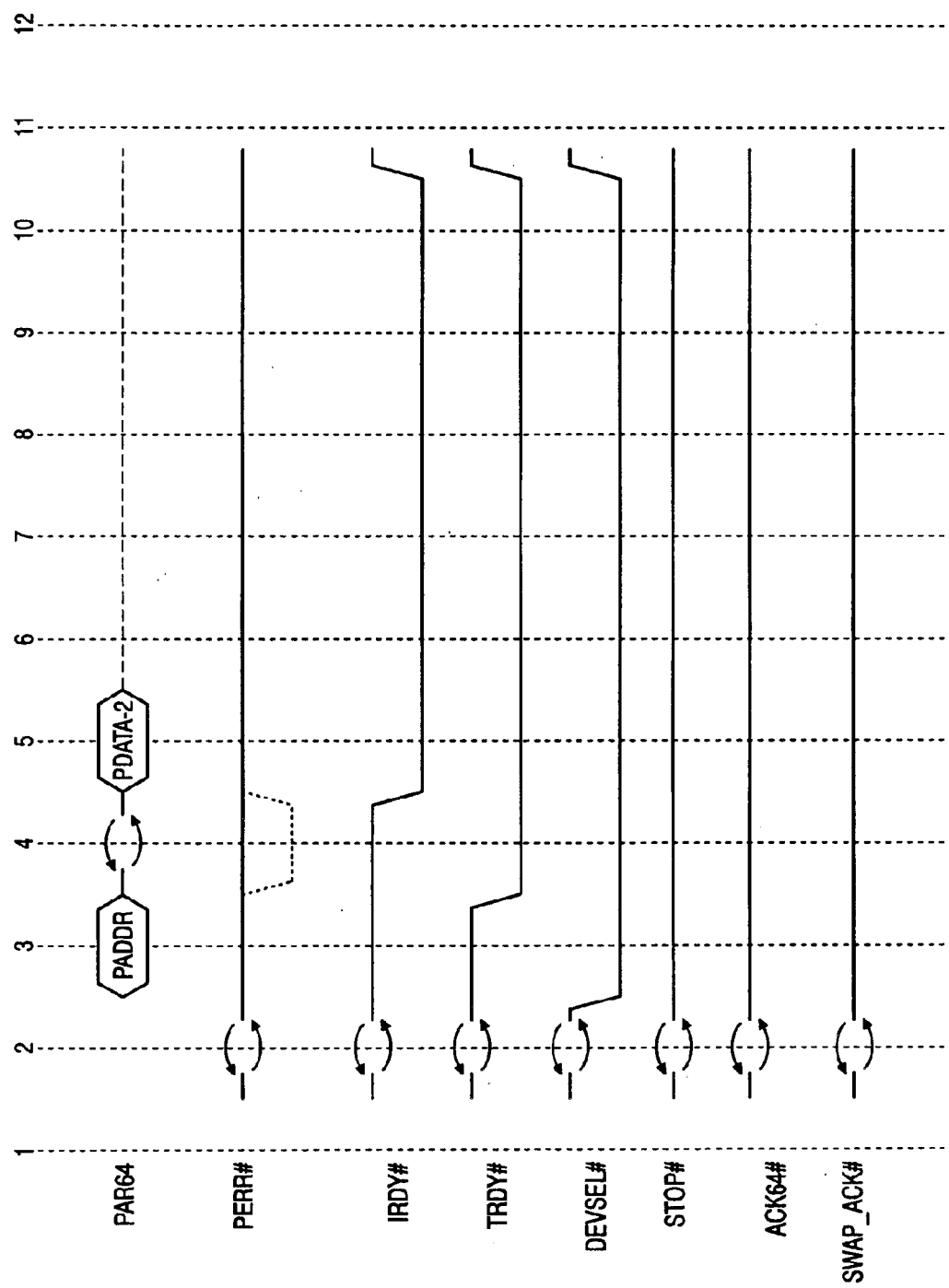

Referring now to FIG. 16, a schematic timing diagram is illustrated of a read transaction having a wait state inserted by the target on a PCI/AGP bus and an address parity error detected on the upper bus. The transaction illustrated in FIG. 16 begins as described above for the transaction illustrated in FIG. 15. The target, however, inserts a wait state by not asserting TRDY# until after CLK 2 so that the target may determine whether a parity error exists on one or both of the upper and lower buses during the address phase. A parity error on the lower bus is based on an incorrect number of 1's on the combination of the AD[31:0] bus, CB/E[3:0] bus, and PAR. A parity error on the upper bus is based on an incorrect number of 1's on the combination of the AD[63:32] bus, CB/E[7:4] bus, and PAR64.

For the example illustrated in FIG. 16, an address parity error on the upper bus is assumed. The target may use the address parity error information to control its transaction setup response to the initiator. Since the address parity error was on the upper bus, the target asserts neither ACK64# nor SWAP_ACK# (64-Bit disabled bit 1102 may also be set), and asserts TRDY# at CLK 4. This tells the initiator that read data will be transferred on the lower bus only. If no data phase parity error(s) is detected by the initiator on the lower bus, then the read transaction proceeds to completion. The present invention, thus, dynamically configures the functional data path for the read transaction without having to request a Retry or Abort. The present invention may also issue a Retry or Abort, and the 64-Bit disabled bit 1102 may be set in the target during the address phase, or in the initiator during the data phase. Then when the initiator starts a new transaction with this target, neither ACK64# nor SWAP_ACK# will be asserted by the target (the 64-bit disabled bit 1102 was previously set in the target during the address phase), or neither REQ64# nor SWAP# will be asserted by the initiator (the 64-bit disabled bit 1102 was previously set in the initiator during the data phase). Since neither ACK64# nor SWAP_ACK# were asserted by the target when TRDY# is asserted, the initiator receives data only on the lower bus. The data initially asserted by the target on the upper bus (data-2) is repeated on the lower bus during CLK 5. The last data transfer is indicated by FRAME# being deserted at CLK 9. REQ64# and SWAP# are deserted after CLK 4 by the initiator once it has been determined that data transfers will occur over only the lower bus.

Figure 17A:
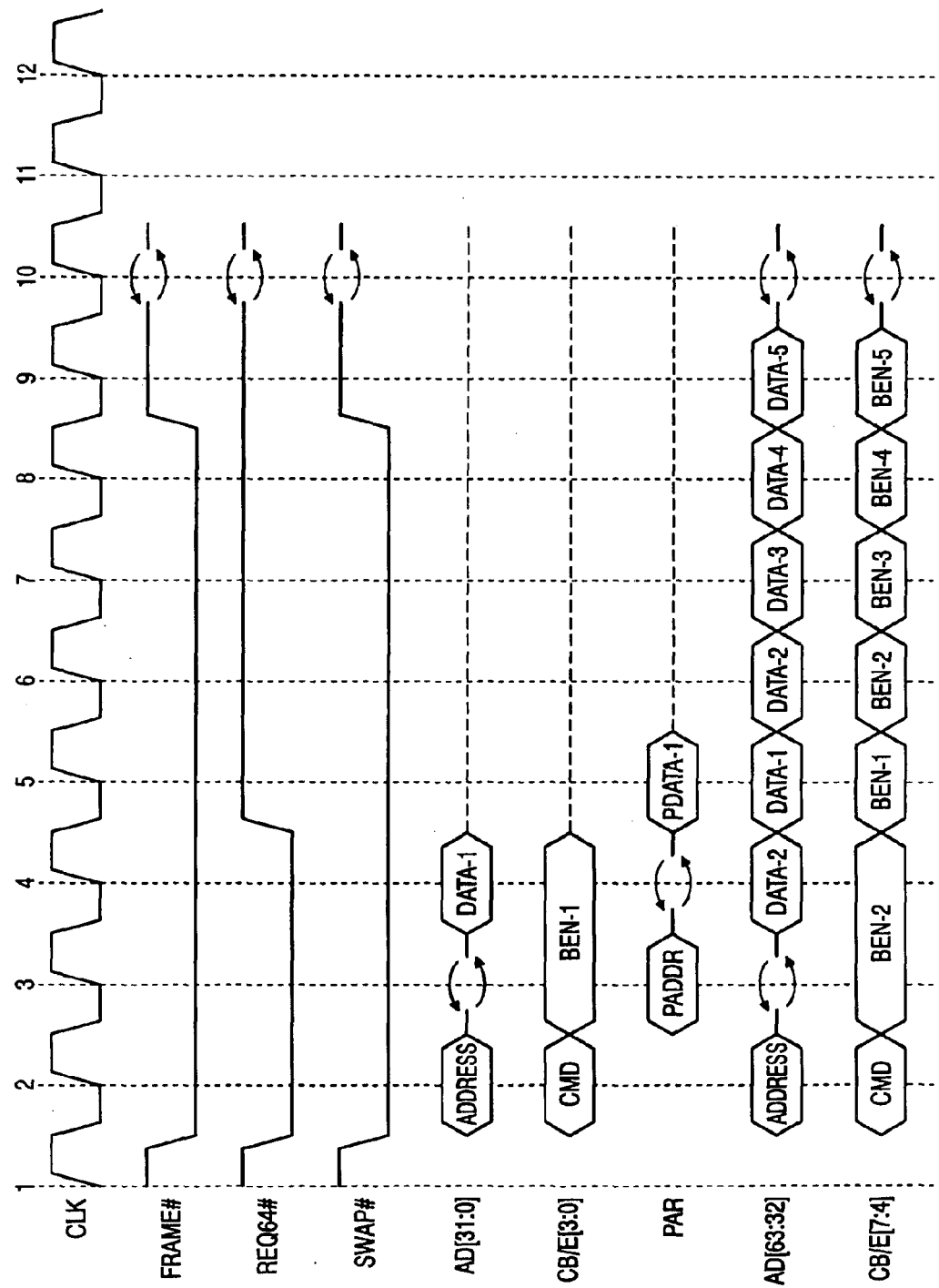
Figure 17B:
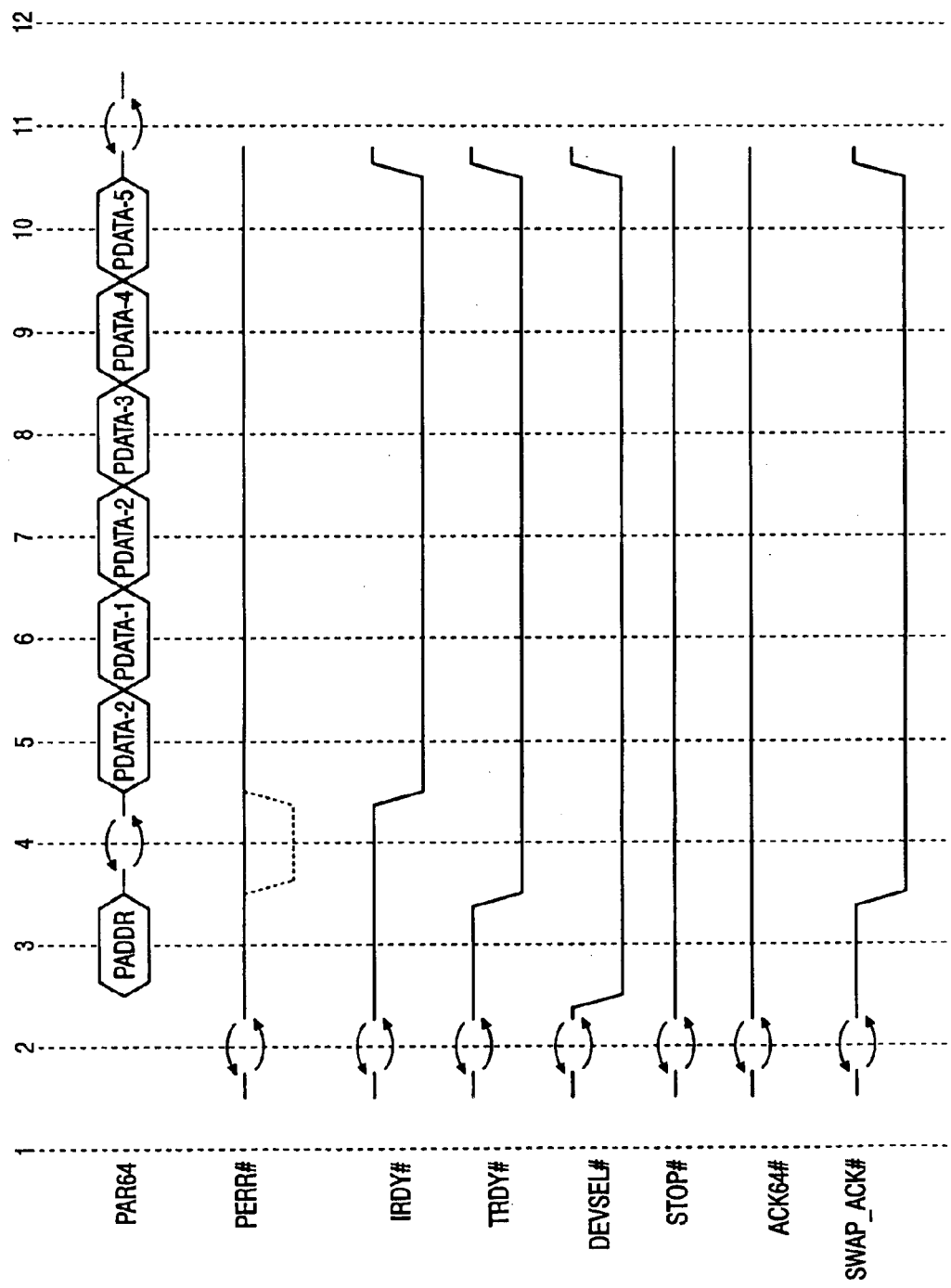

Referring now to FIG. 17, a schematic timing diagram is illustrated of a read transaction having a wait state inserted by the target on a PCI/AGP bus and an address parity error detected on the lower bus. The transaction illustrated in FIG. 17 begins as described above for the transaction illustrated in FIG. 15. The target, however, inserts a wait state by not asserting TRDY# until after CLK 2 so that the target may determine whether a parity error exists on one or both of the upper and lower buses during the address phase. A parity error on the lower bus is based on an incorrect number of 1's on the combination of the AD[31:0] bus, CB/E[3:0] bus, and PAR. A parity error on the upper bus is based on an incorrect number of 1's on the combination of the AD[63:32] bus, CB/E[7:4] bus, and PAR64.

For the example illustrated in FIG. 17, an address parity error on the lower bus is assumed. The target may use the address parity error information to control its transaction setup response to the initiator. Since the address parity error was on the lower bus, the target asserts SWAP_ACK# but not ACK64# (Swap enabled bit 1104 may also be set), and asserts TRDY# at CLK 4. This tells the target to transfer data on the upper bus only. If no data parity error(s) is detected by the initiator on the upper bus, then the read transaction proceeds to completion. The present invention, thus, dynamically configures the functional data path for the read transaction without having to request a Retry or Abort. The present invention may also issue a Retry or Abort after setting the 64-Bit disabled bit 1102 and/or Swap enabled bit 1104 in the initiator. Then when the initiator starts a new transaction with this target, SWAP# will be asserted (Swap enabled bit 1104 was previously set) but not REQ64#. The data initially asserted by the target on the lower bus (data-1) and the upper PCI bus (data-2) at CLK 4 is repeated on the upper bus at CLK 5 and CLK 6, respectively. The last data transfer is indicated by FRAME# being deserted at CLK 9. REQ64# is deserted after CLK 4 by the initiator once it has been determined that data transfers will occur over only the upper bus.

Figure 18A:
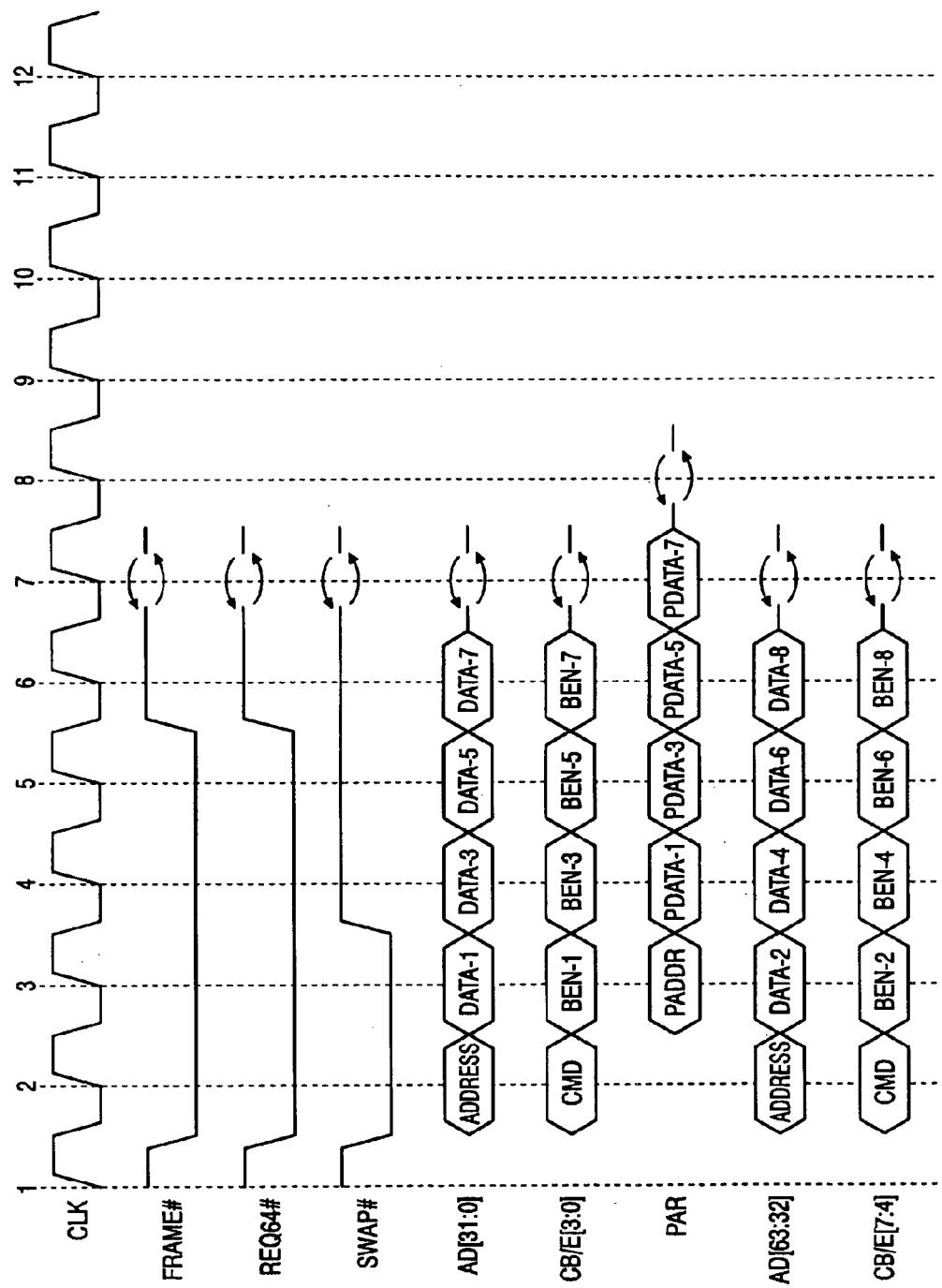
Figure 18B:
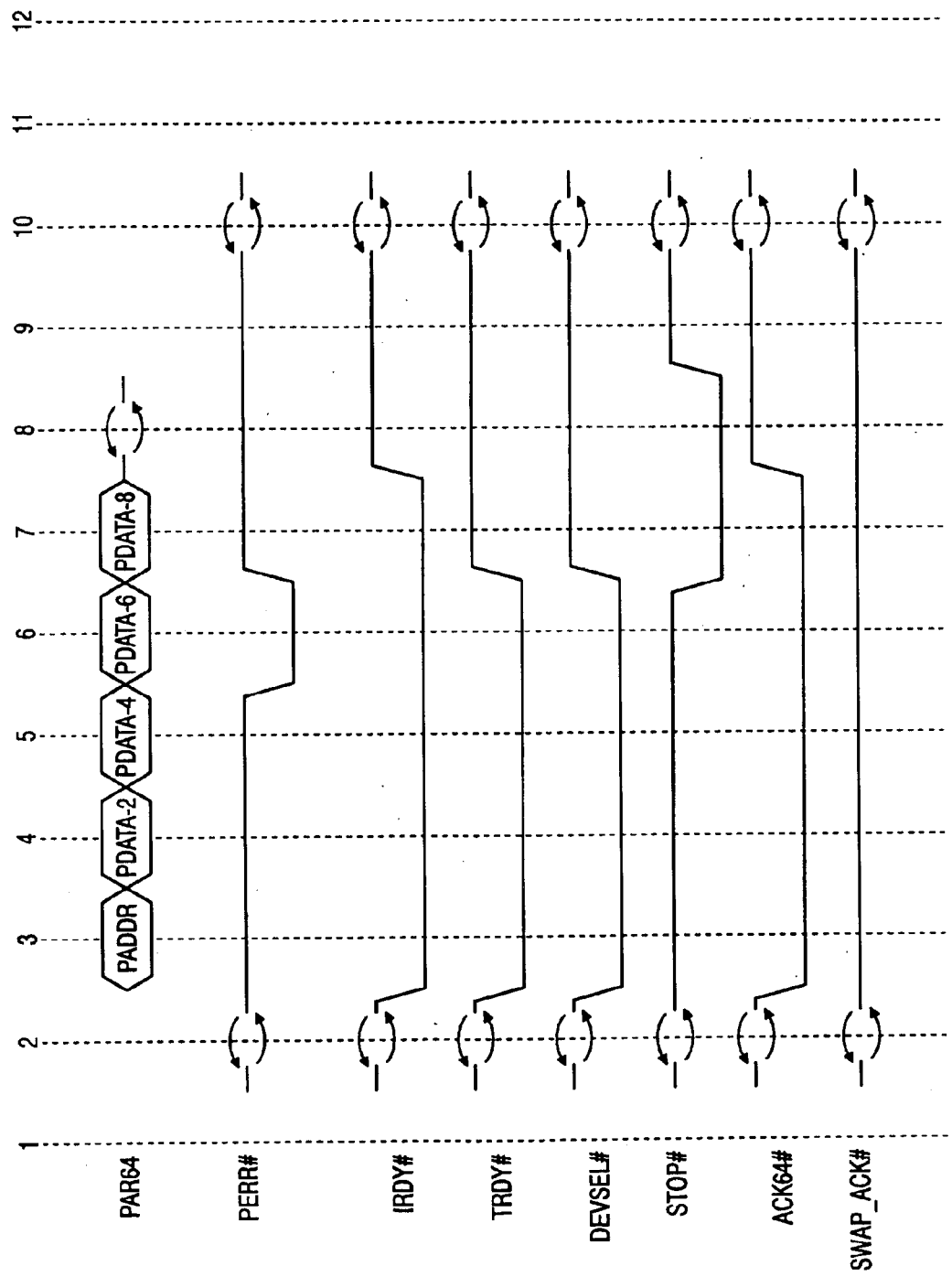

Referring now to FIG. 18, a schematic timing diagram is illustrated of a 64-bit data-width write transaction having a data parity error on the upper bus of a PCI/AGP bus. Assume that an initiator has arbitrated for and obtained (owns) the bus (not illustrated). Now during clock 1 (CLK1), FRAME#, REQ64#, and SWAP# are asserted by the initiator. There are no predisposed restrictions set in the initiator (i.e., 64-Bit disabled bit or Swap enabled bit are not set). Also during CLK 1 the transaction address is asserted on both the AD[31:0] and AD[63:32] buses, and the transaction command is asserted on both CB/E[3:0] and CB/E[7:0] buses. Applying the transaction address and command during the address phase of the transaction redundantly to both the lower and upper buses may allow the target to determine whether one or both of the buses has a fault by calculating whether there exists a parity error for the transaction address on either or both of the buses, as disclosed above for the example illustrated in FIG. 12.

Once the target decodes its address, it will assert DEVSEL# and may assert ACK64# which indicates that a 64-bit data-width transaction during the data phase may proceed. Once IRDY# and TRDY# are asserted, data may be transferred from the initiator to the target during the data phase write transaction. Since SWAP_ACK# was not asserted by the target, the initiator may dessert SWAP# since it serves no further purpose in the instant transaction.

The last data transfer is indicated by FRAME# being deserted.

The initiator calculates values for PAR and PAR64, and asserts them one clock after the respective address or data values, so that an even parity is generated in conjunction with the combination of the AD[31:0] and CB/E[3:0] buses, and the AD[63:32] and CB/E[7:3] buses, respectively. The target uses the number of 1's received on the AD[31:0] bus, CB/E[3:0] bus and PAR to verify that an even parity was received on the lower bus, and number of 1's received on the AD[63:32] bus, CB/E[7:4] bus and PAR64 to verify that an even parity was received on the upper bus.

In the example illustrated in FIG. 18, the target does not calculate during the data phase an even parity on the upper bus and it asserts PERR#. The clock after the target asserts PERR#, the target desserts TRDY# and DEVSEL#, and asserts STOP#. This indicates to the initiator a "Target-Abort" and the initiator driver software and, possibly, the operating system software may be alerted and attempt to recover from this Target-Abort. The 64-Bit disabled bit 1102 may be set in this target so that during the next write transaction the target will not assert ACK64#, thus preventing the use of the upper bus having the parity error.

In a similar fashion, a parity error on the lower bus may be avoided by setting the Swap enabled bit 1104 in the target command register 1002, then during the next write transaction, assuming the upper bus is free of parity errors, the target will assert SWAP# but not ACK64#, thus preventing the use of the lower bus having the parity error.

Figure 19:
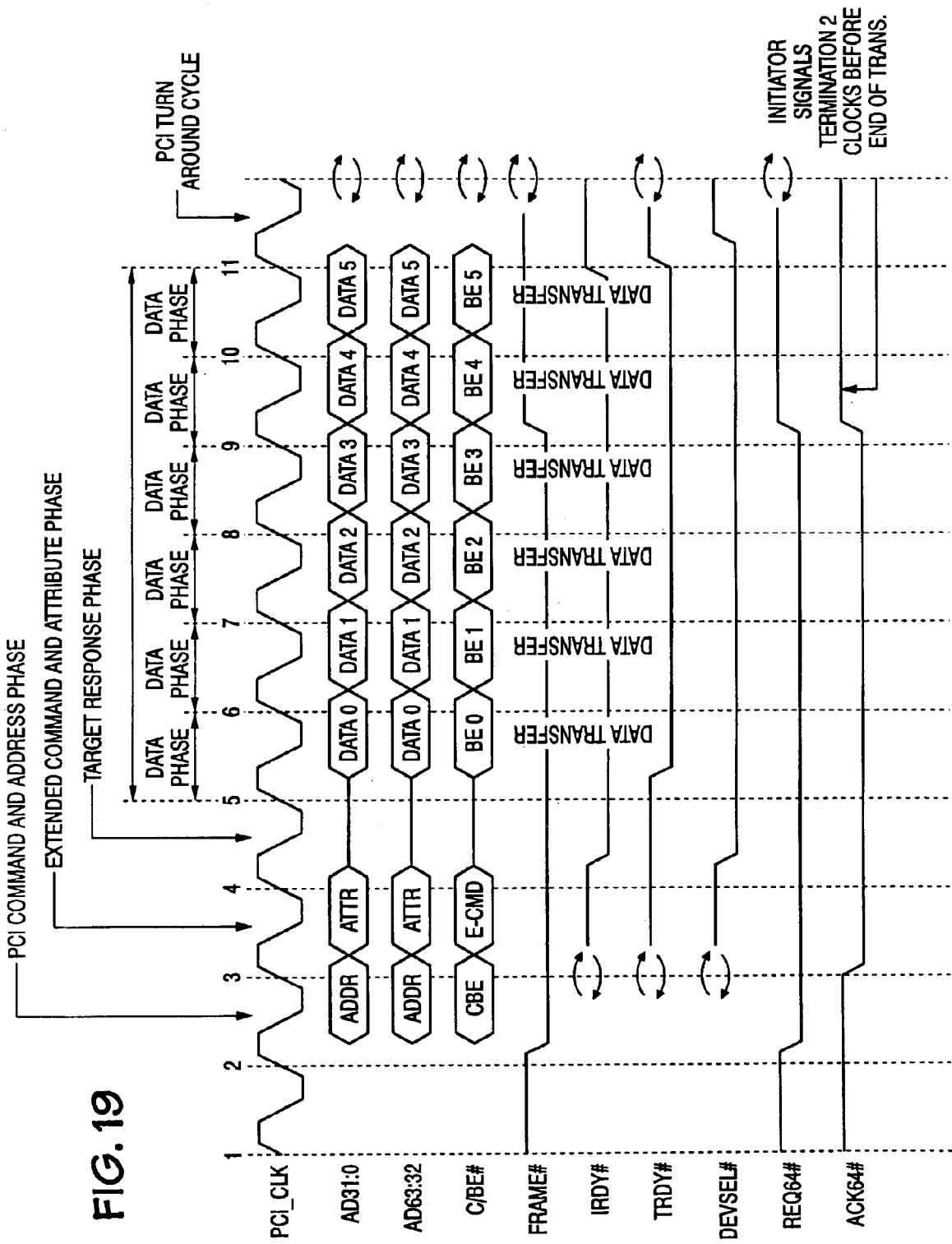
FIG. 19 is a schematic timing diagram of a PCI-X write transaction without the fault-tolerant feature of the present invention.

FIG. 19 illustrates a schematic timing diagram of a basic PCI-X write transaction without the fault-tolerant feature described above. The Figure is provided to illustrate the similarities between a conventional PCI write transaction illustrated in FIG. 12, for example, and a PCI-X transaction.

FIG. 20 is a schematic timing diagram of a PCI-X write transaction with the fault-tolerant feature described above. As can be seen from FIG. 20, the fault-tolerant feature is implemented in a manner similar to that described above for the conventional PCI transaction. Thus, as described above with respect to the conventional PCI transactions, the bus master may assert both the REQ64# and SWAP# signals on the bus. The PCI-X target may respond to the asserted REQ64# and SWAP# signals by asserting either the ACK64# signal, the SWAP_ACK# signal, or neither the ACK64# nor the SWAP_ACK# signals. As previously discussed, these three target responses correspond to the target being ready (after also asserting DEVSEL# and TRDY# signals) to transfer data at either 64 bits across both the upper and lower buses, 32 bits across only the upper bus, or 32 bits across only the lower bus, respectively.

As discussed above, when the universal PCI/PCI-X/AGP bus 207 is used for advanced graphics applications, the fault-tolerant feature using the ACK64# and SWAP_ACK# signals may be disabled by the system software.

While the invention may be susceptible to various modifications and alternative forms, specific embodiments have been shown by way of example in the drawings and will be described in detail herein. However, it should be understood that the invention is not intended to be limited to the particular forms disclosed. For example, the invention has been described with respect to detection of parity errors that occur during a transaction. However, it should be understood that parity error detection is discussed merely as exemplary scheme that may be implemented to detect the occurrence of errors on the fault-tolerant bus, and the invention is intended to encompass error detection schemes other than parity error detection. Thus, the invention is to cover all modifications, equivalents and alternatives falling within the spirit and scope of the invention as defined by the following appended claims.

What is claimed is:

1. A computer system, comprising:
   a host bus;
   an input/output (I/O) fault-tolerant interconnect system; and
   a core logic chipset comprising a bridge interface configurable to implement either one of an accelerated graphics bus bridge and a peripheral component interconnect bridge, wherein the configurable bridge interface is connectable between the host bus and the I/O fault-tolerant interconnect system, the I/O fault-tolerant interconnect system comprising:
      an I/O bus selectively comprising one of a first type bus and a second type bus, the I/O bus comprising a first bus portion and a second bus portion, wherein the first type bus comprises an accelerated graphics port bus, and the second type bus comprises a peripheral component interconnect bus; and
      a device interface connectable to the I/O bus, wherein the device interface is configured to detect errors in a transaction received by the device interface, wherein,
         if a first error is detected on the first bus portion, then the transaction is performed over the second bus portion; and
         if a second error is detected on the second bus portion, then the transaction is performed over the first bus portion.

2. The system as recited in claim 1, wherein if both the first and second errors are detected, then the transaction is terminated.

3. The system as recited in claim 1, wherein the first error and the second error comprise parity errors.

4. The system as recited in claim 1, wherein the peripheral component interconnect bus comprises a PCI-X bus.

5. The system as recited in claim 1, comprising a second input/output (I/O) bus, wherein the core logic chipset comprises a second bridge interface connectable between the host bus and the second I/O bus.

6. The system as recited in claim 5, wherein the second I/O bus comprises a peripheral component interconnect bus.

7. The system as recited in claim 1, wherein the transaction comprises an address phase and a data phase, and wherein the device interface is configured to detect errors during the address phase, and wherein,
   if the first error is detected on the first bus portion, then the data phase is completed over the second bus portion; and
   if the second error is detected on the second bus portion, then the data phase is completed over the first bus portion.

8. The system as recited in claim 1, wherein the core logic chipset comprises at least one integrated circuit.

9. The system as recited in claim 8, wherein the at least one integrated circuit comprises at least one application specific integrated circuit.

10. The system as recited in claim 8, wherein the at least one integrated circuit comprises at least one programmable logic array integrated circuit.

11. The system as recited in claim 1, wherein the host bus and the I/O bus are disposed on a substrate.

12. The system as recited in claim 11, wherein the substrate is a printed circuit board.

13. The system as recited in claim 11, wherein the I/O bus is a universal bus comprising a plurality of universal conductive paths disposed on the substrate, and wherein the first type bus and the second type bus share common signals on the plurality of universal conductive paths.

14. The system as recited in claim 1, wherein the configured bridge interface is configured for either the first type bus or the second type by software control of the core logic chipset.

15. The system as recited in claim 1, wherein the configured bridge interface is configured for either the first type bus or the second type bus when either a first type device or a second type device, respectively, is detected on the I/O bus.

16. The system as recited in claim 15, wherein the first type device comprises and accelerated graphics port device, and the second type device comprises a peripheral component interconnected device.

17. The system as recited in claim 15, wherein the configured bridge interface is configured during power on self test of the computer system.

18. The system as recited in claim 15, wherein the configurable bridge interface is configured during configured of the computer system.

19. A computer system comprising:
   a host bus;
   an input/output (I/O) fault-tolerant interconnect system; and
   a core logic chipset comprising a configurable bridge interface connectable between the host bus and the I/O fault-tolerant interconnect system, the I/O fault-tolerant interconnect system comprising:
      an I/O bus selectively comprising one of a first type bus and a second type bus, the I/O bus comprising a first bus portion and a second bus portion; and
   a device interface connectable to the I/O bus, wherein the device interface is configured to detect errors in a transaction received by the device interface, wherein,
      if a first error is detected on the first bus portion, then the transaction is performed over the second bus portion; and
      if a second error is detected on the second bus portion, then the transaction is performed over the first bus portion; and
   wherein the device interface comprises a target interface, and the fault-tolerant interconnect system comprises an initiator interface connectable to the I/O bus, wherein the initiator interface requests the target interface for the transaction to be performed over the first and second bus portions; and
      the target interface responds to the initiator interface, whereby, an acknowledge first and second portions signal indicates the transaction may be performed over the first and second bus portions;

an acknowledge first portion signal indicates the transaction may be performed over the first bus portion; and an acknowledge second portion signal indicates the transaction may be performed over the second bus portion.

20. The system as recited in claim 19, wherein the acknowledge first and second portions signal is sent to the initiator interface only after the target interface determines that the first and second errors are not detected.

21. The system as recited in claim 19, wherein the acknowledge first portion signal is sent to the initiator interface only after the target interface determines that the first error is not detected.

22. The system as recited in claim 19, wherein the acknowledge second portion signal is sent to the initiator interface only after the target interface determines that the second error is not detected.

23. The system as recited in claim 1, wherein the I/O bus comprises a 64-bit bus, and wherein the first bus portion is a first 32-bit bus and the second bus portion is a second 32-bit bus.

24. The system as recited in claim 1, wherein the configurable bridge interface is configured in response to receipt of a configuration signal.

25. The system as recited in claim 24, wherein the configuration signal is generated by a hardwired jumper circuit.

26. A computer system, comprising:
a host processor connected to a host bus;
a memory connected to a memory bus;
a first input/output (I/O) bus;
an input/output (I/O) fault-tolerant interconnect system; and
a core logic chipset comprising:
a first bridge interface between the host bus and the first I/O bus;
a second bridge interface configurable to implement either one of an accelerated graphics bus bridge and a peripheral component interconnect bridge, wherein the configurable bridge interface is between the host bus and the I/O fault-tolerant interconnect system, the I/O fault-tolerant interconnect system comprising:
a second input/output (I/O) bus selectively comprising one of a first type bus and a second type bus, the second I/O bus comprising a first bus portion and a second bus portion, wherein the first type bus comprises an accelerated graphics port bus, and the second type bus comprises a peripheral component interconnect bus; and
a device interface connected to the second I/O bus, wherein the device interface is configured to detect errors in a transaction received by the device interface, wherein,
if a first error is detected on the first bus portion, then the transaction is performed over the second bus portion; and
if a second error is detected on the second bus portion, then the transaction is performed the first bus portion.

27. The system as recited in claim 26, wherein if the first and second errors are detected, then the transaction is terminated.

28. The system as recited in claim 26, wherein the first and second errors comprise parity errors.

29. The system as recited in claim 26, wherein the configurable bridge interface is configured in response to a configuration signal generated by a hardwired jumper circuit.

30. The system as recited in claim 26, wherein the configured bridge interface is configured by software control of the logic chipset.

31. The system as recited in claim 26, wherein the configurable bridge interface is configured for the first type bus if a first type device is detected connected to the second I/O bus.

32. The method as recited in claim 31, wherein the peripheral component interconnect bus comprises a PCI-X bus.

33. The system as recited in claim 26, wherein the second bridge interface is configured for the second type bus if a second type device is detected connected to the second I/O bus.

34. The method as recited in claim 31, comprising the act of generating the first configuration signal upon detection of a peripheral component interconnect device connected to the fault-tolerant I/O bus.

35. The method as recited in claim 31, comprising the act of generating the second configuration signal upon detection of an accelerated graphics port device connected to the fault-tolerant I/O bus.

36. A computer system comprising:
a host processor connected to a host bus;
a memory connected to a memory bus;
a first input/output (I/O) bus;
an input/output (I/O) fault-tolerant interconnect system; and
a core logic chipset comprising:
a first bridge interface between the host bus and the first I/O bus;
a configurable second bridge interface between the host bus and the I/O fault-tolerant interconnect system, the I/O fault-tolerant interconnect system comprising:
a second input/output (I/O) bus comprising one of a first type bus and a second type bus, the second I/O bus comprising a first bus portion and a second bus portion; and
a device interface connected to the second I/O bus, wherein the device interface is configured to detect errors in a transaction received by the device interface, wherein
if a first error is detected on the first bus portion, then the transaction is performed over the second bus portion; and
if a second error is detected on the second bus portion, then the transaction is performed the first bus portion; and
wherein the device interface comprises a target interface, and the fault-tolerant interconnect system comprises:
an initiator device interface connected to the second I/O bus, wherein the initiator interface requests the target interface for the transaction to be performed over the first and second bus portions; and
the target interface responds to the initiator interface, whereby,
an acknowledge first and second portions signal indicates the transaction may be performed over the first and second bus portions;

an acknowledge first portion signal indicates the transaction may be performed over the first bus portion; and an acknowledge second portion signal indicates the transaction may be performed over the second bus portion.

37. The system as recited in claim 36, comprising a first peripheral component interconnect device connected to the second I/O bus, the first peripheral component interconnect device comprising the target interface.

38. The system as recited in claim 37, comprising a second peripheral component interconnect device connected to the second I/O bus, the peripheral second component interconnect device comprising the initiator interface.

39. The system as recited in claim 38, wherein the first and second peripheral component interconnect devices comprise first and second PCI-X devices.

40. A method of configuring a core logic chipset for connecting between a host bus and a fault-tolerant input/output (I/O) bus, the fault-tolerant I/O bus comprising either a first type bus or a second type bus, the method comprising the acts of:

providing a core logic chipset configurable to implement either one of an accelerated graphics bus bridge and a peripheral component interconnect bridge, wherein the configurable bridge interface is connected to a host bus and to a fault-tolerant I/O bus, the fault-tolerant I/O bus comprising either a first type I/O bus or a second type I/O bus, the fault-tolerant I/O bus comprising a first bus portion and a second bus portion, wherein the first type bus comprises a peripheral component interconnect bus, and the second type bus comprises an accelerated graphics port bus;

configuring the core logic chipset to interface between either the first type bus or the second type bus;

providing a first device interface connected to the fault-tolerant I/O bus;

determining occurrence of an error in a transaction received by the device interface on the fault-tolerant I/O bus;

performing the transaction over the second bus portion if occurrence of a first error is determined on the first bus portion; and performing the transaction over the first bus portion if occurrence of a second error is determined on the second bus portion.

41. The method as recited in claim 40, comprising terminating the transaction if occurrence of both the first and second errors is determined.

42. The method as recited in claim 40, wherein the first and second errors comprise parity errors.

43. The method as recited in claim 40, comprising the acts configuring the core logic chipset to interface between the host bus and the first type bus if a first configuration signal is applied to the core logic chipset; and configuration the core logic chipset to interface between the host bus and the second type bus if a second configuration signal is applied to the core logic chipset.

44. The method as recited in claim 40, wherein the fault-tolerant I/O bus comprises a 64-bit bus, and the first bus portion comprises a first 32-bit bus and the second bus portion comprises a second 32-bit bus.

45. The method as recited in claim 40, wherein the first type bus comprises a peripheral component interconnect bus, and the second type bus comprises an accelerated graphics port bus.

46. A method of configuring a core logic chipset for connecting between a host bus and a fault-tolerant input/output (I/O) bus, the fault-tolerant I/O bus comprising either a first type bus or a second type bus, the method comprising the acts of:

providing a core logic chipset connected to a host bus and to a fault-tolerant I/O bus, the fault-tolerant I/O bus comprising either a first type I/O bus or a second type I/O bus, the fault-tolerant I/O bus comprising a first bus portion and a second bus portion,;

configuring the core logic chipset to interface between either the first type bus or the second type bus;

providing a first device interface connected to the fault-tolerant I/O bus; determining occurrence of an error in a transaction received by the device interface on the fault-tolerant I/O bus;

performing the transaction over the second bus portion if occurrence of a first error is determined on the first bus portion; and performing the transaction over the first bus portion if occurrence of a second error is determined on the second bus portion;

providing a second device interface connected to the fault-tolerant I/O bus;

transmitting a request from the second device interface to the first device interface for the transaction to be performed over the first and second bus portions;

transmitting a response from the first device interface to the second device interface, the response comprising either:

an acknowledge first and second portions signal to indicate that the transaction may be performed over the first and second bus portions;

an acknowledge first portion signal to indicate that the transaction may be performed over the first bus portion; or an acknowledge second portion signal to indicate that the transaction may be performed over the second bus portion.

* * * * *

UNITED STATES PATENT AND TRADEMARK OFFICE
CERTIFICATE OF CORRECTION

| | | |
|---|---|---|
| PATENT NO. | : 6,898,740 B2 | Page 1 of 1 |
| APPLICATION NO. | : 09/769953 | |
| DATED | : May 24, 2005 | |
| INVENTOR(S) | : Sompong P. Olarig | |

It is certified that error appears in the above-identified patent and that said Letters Patent is hereby corrected as shown below:

IN THE CLAIMS

Claim 16, Column 24, line 31, after "comprises" delete "and" and insert therefor --an--

Signed and Sealed this

Twenty-third Day of June, 2009

JOHN DOLL
*Acting Director of the United States Patent and Trademark Office*